(12) United States Patent
Takahashi

(10) Patent No.: US 10,048,490 B2
(45) Date of Patent: Aug. 14, 2018

(54) DRIVE SYSTEM, VIDEO DEVICE, IMAGE PROJECTION DEVICE, AND DRIVE CONTROL METHOD

(71) Applicant: Hiroyuki Takahashi, Miyagi (JP)

(72) Inventor: Hiroyuki Takahashi, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 20 days.

(21) Appl. No.: 15/234,626

(22) Filed: Aug. 11, 2016

(65) Prior Publication Data

US 2017/0052365 A1    Feb. 23, 2017

(30) Foreign Application Priority Data

Aug. 18, 2015   (JP) .................. 2015-161414
Jun. 20, 2016   (JP) .................. 2016-121943

(51) Int. Cl.
| G02B 26/08 | (2006.01) |
| G02B 26/10 | (2006.01) |
| H04N 9/31 | (2006.01) |
| H02N 2/00 | (2006.01) |
| G09G 3/02 | (2006.01) |

(52) U.S. Cl.
CPC ......... *G02B 26/0858* (2013.01); *G02B 26/08* (2013.01); *G02B 26/101* (2013.01); *G09G 3/025* (2013.01); *H02N 2/0095* (2013.01); *H04N 9/3161* (2013.01); *G09G 3/02* (2013.01); *G09G 2330/028* (2013.01); *G09G 2340/0464* (2013.01)

(58) Field of Classification Search
CPC .... H02N 2/0095; H04N 9/3161; G02B 26/08; G02B 26/0833; G02B 26/0858; G02B 26/101; G09G 3/025; G09G 3/02

USPC ................ 359/199.4; 310/317, 318
See application file for complete search history.

(56) References Cited

U.S. PATENT DOCUMENTS

| 5,245,463 A | 9/1993 | Goto |
| 5,418,546 A | 5/1995 | Nakagakiuchi et al. |
| 5,444,565 A | 8/1995 | Goto |
| 5,546,128 A | 8/1996 | Nakagakiuchi et al. |
| 2004/0207290 A1 | 10/2004 | Okada |
| 2005/0122069 A1 | 6/2005 | Okada |

(Continued)

FOREIGN PATENT DOCUMENTS

| EP | 0 528 646 A1 | 2/1993 |
| EP | 1 640 956 A2 | 3/2006 |

(Continued)

OTHER PUBLICATIONS

Extended European Search Report dated Nov. 16, 2016 in Patent Application No. 16183792.7.

*Primary Examiner* — William R Alexander
(74) *Attorney, Agent, or Firm* — Oblon, McClelland, Maier & Neustadt, L.L.P.

(57) ABSTRACT

A drive system includes an actuator, a waveform generating unit, a driving amplifier, and a bias amplifier. The actuator includes a drive unit. The waveform generating unit generates a voltage waveform for driving the drive unit. The driving amplifier amplifies the voltage waveform so as to apply a voltage to the drive unit. The bias amplifier applies a bias voltage to the drive unit. The driving amplifier and the bias amplifier are coupled to a shared power supply and the ground. The output voltage of the bias amplifier is higher than the minimum output voltage of the driving amplifier.

12 Claims, 24 Drawing Sheets

(56) References Cited

U.S. PATENT DOCUMENTS

| | | | |
|---|---|---|---|
| 2005/0174473 A1* | 8/2005 | Morgan | F21S 48/325 |
| | | | 348/370 |
| 2006/0066594 A1 | 3/2006 | Tyger | |
| 2009/0309661 A1* | 12/2009 | Chang | H03F 1/0272 |
| | | | 330/285 |
| 2012/0013220 A1* | 1/2012 | Kawata | B06B 1/0269 |
| | | | 310/317 |
| 2013/0242283 A1* | 9/2013 | Bailey | G01S 17/89 |
| | | | 356/4.01 |
| 2014/0028397 A1* | 1/2014 | Dhanasekaran | H03F 3/45179 |
| | | | 330/261 |
| 2014/0167860 A1* | 6/2014 | Dhanasekaran | H03F 1/0227 |
| | | | 330/296 |

FOREIGN PATENT DOCUMENTS

| | | |
|---|---|---|
| JP | 2570237 | 10/1996 |
| JP | 2921218 | 4/1999 |
| JP | 3804312 | 5/2006 |
| JP | 2007-155984 | 6/2007 |
| JP | 2007-226108 | 9/2007 |
| JP | 2007-240626 | 9/2007 |
| JP | 2007-241169 | 9/2007 |
| JP | 2008-116668 | 5/2008 |
| JP | 2010-026443 | 2/2010 |
| JP | 2011-004339 | 1/2011 |
| JP | 2012-022537 | 2/2012 |
| JP | 2012-168444 | 9/2012 |

* cited by examiner

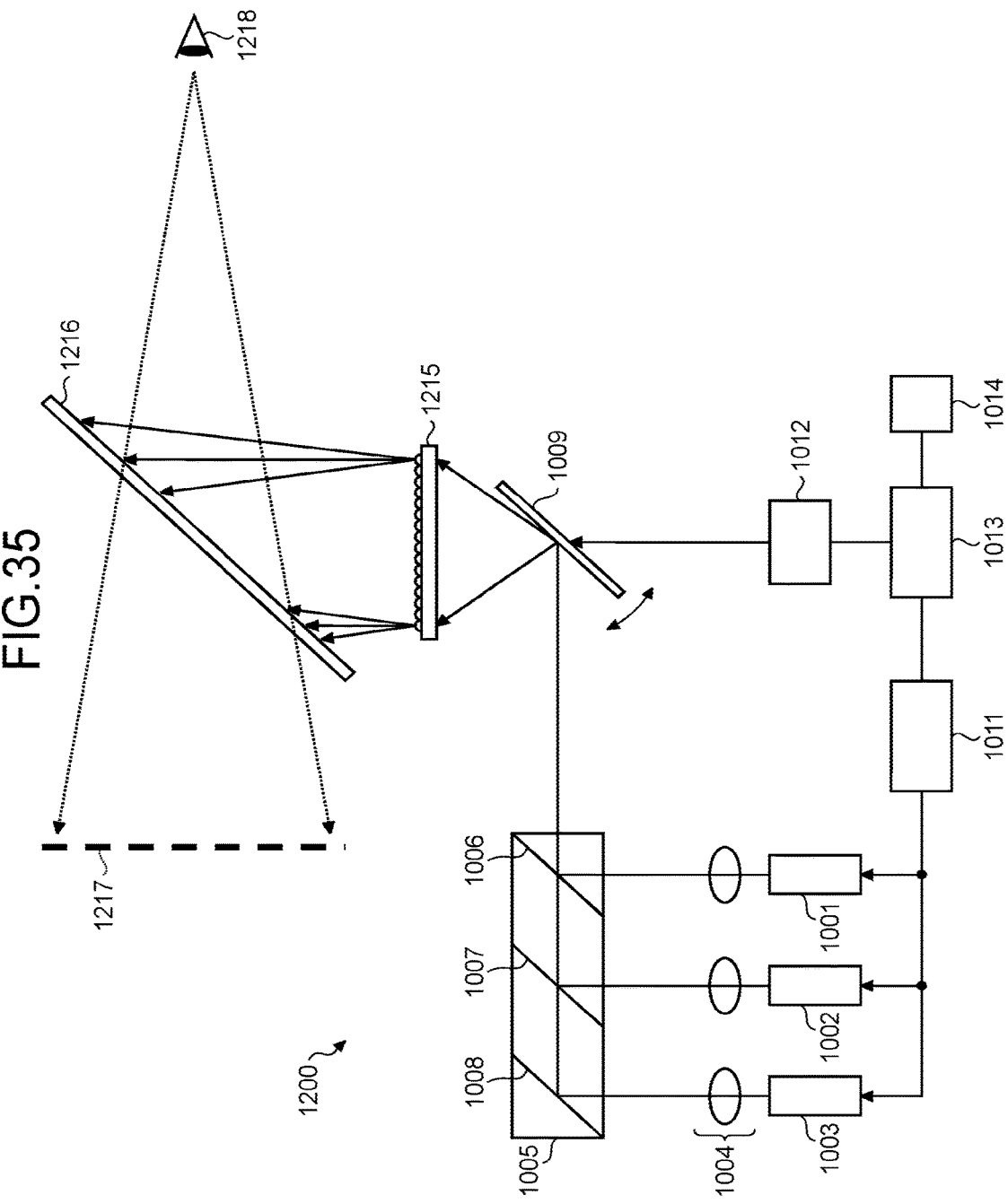

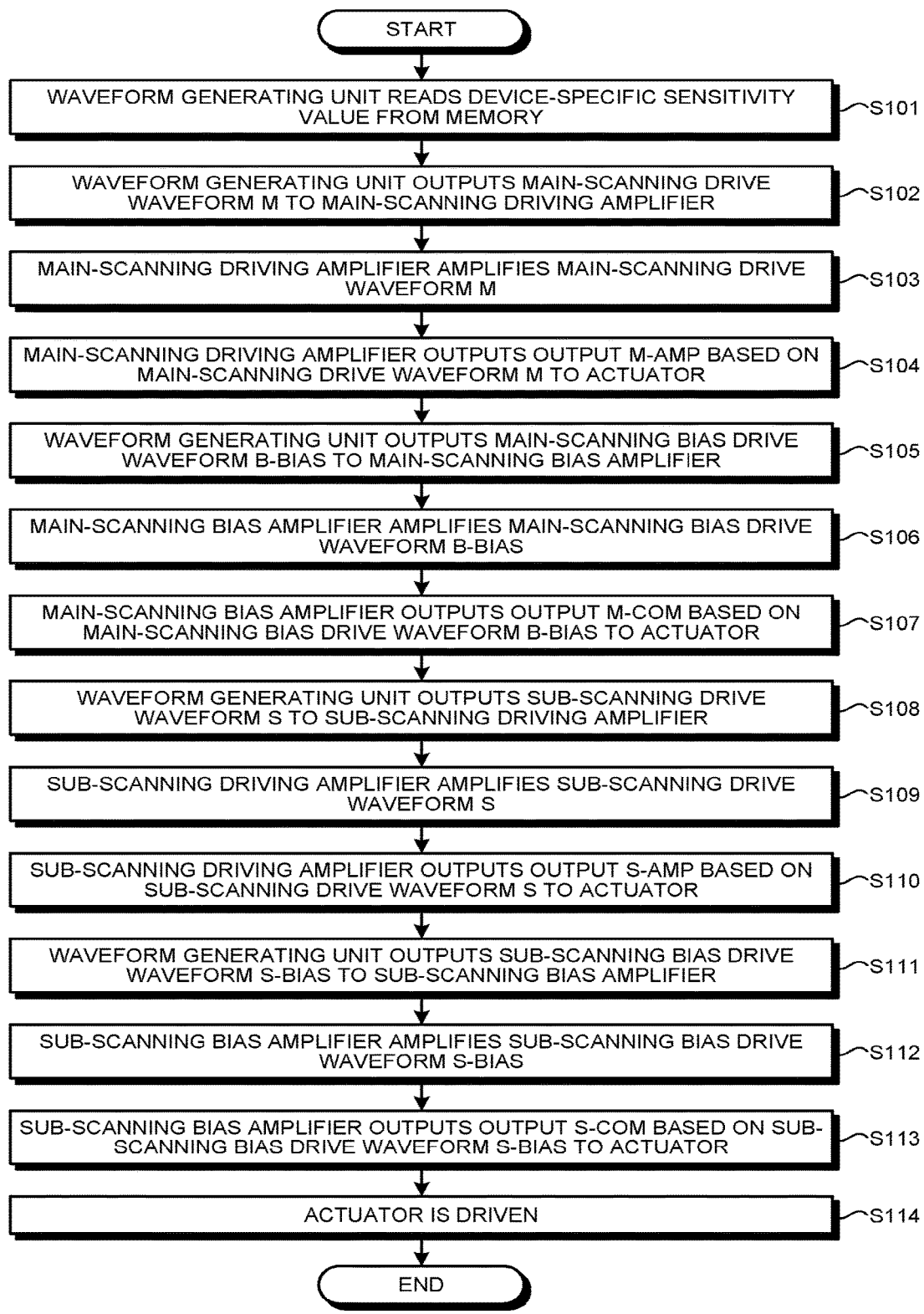

DRIVE SYSTEM, VIDEO DEVICE, IMAGE PROJECTION DEVICE, AND DRIVE CONTROL METHOD

CROSS-REFERENCE TO RELATED APPLICATIONS

The present application claims priority under 35 U.S.C. § 119 to Japanese Patent Application No. 2015-161414, filed Aug. 18, 2015 and Japanese Patent Application No. 2016-121943, filed Jun. 20, 2016. The contents of which are incorporated herein by reference in their entirety.

BACKGROUND OF THE INVENTION

1. Field of the Invention

The present invention relates to a drive system, a video device, an image projection device, and a drive control method.

2. Description of the Related Art

A piezoelectric element is known to exert a so-called inverse piezoelectric effect that when applied with voltage in a direction of electrodes, deforms, i.e., contracts in proportion to an electrical potential of the applied voltage. Conventionally, there is developed a piezoelectric actuator that transmits a driving force to a driven body by using such a piezoelectric element.

A piezoelectric element used in a piezoelectric actuator exerts a driving force in a state of being polarized in one direction, for example, like a permanent magnet; its driving force can be obtained by connecting the output of a drive circuit to between electrodes installed on both end faces of the piezoelectric element in a polarization direction. The above-mentioned polarization is obtained by continuing to apply a constant voltage for a predetermined period of time in consideration of the composition of the element. The element which has had polarization is driven by being applied with voltage in between a direction of the voltage that has caused the polarization and zero in general.

Conventionally, to maintain polarization of a piezoelectric element, the piezoelectric element is driven by positive voltage from the ground (GND). An actuator composed of a piezoelectric element basically has the structure of a capacitor. Therefore, its capacity is very large, and it is difficult to drive the actuator with a general operational amplifier. Accordingly, in general, a circuit that amplifies current is added to the output stage of the amplifier. However, there is a problem that the output from GND is impossible with a single supply (a positive supply only), so a negative supply is required structurally, which results in a substantial increase in cost.

SUMMARY OF THE INVENTION

According to one aspect of the present invention, a drive system includes an actuator, a waveform generating unit, a driving amplifier, and a bias amplifier. The actuator includes a drive unit. The waveform generating unit generates a voltage waveform for driving the drive unit. The driving amplifier amplifies the voltage waveform so as to apply a voltage to the drive unit. The bias amplifier applies a bias voltage to the drive unit. The driving amplifier and the bias amplifier are coupled to a shared power supply and the ground. The output voltage of the bias amplifier is higher than the minimum output voltage of the driving amplifier.

BRIEF DESCRIPTION OF THE DRAWINGS

FIG. 35 is a schematic diagram illustrating a schematic configuration example of a head-up display according to a variation of the seventh embodiment; and FIG. 36 is a flowchart illustrating an example of a drive control method according to an eighth embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
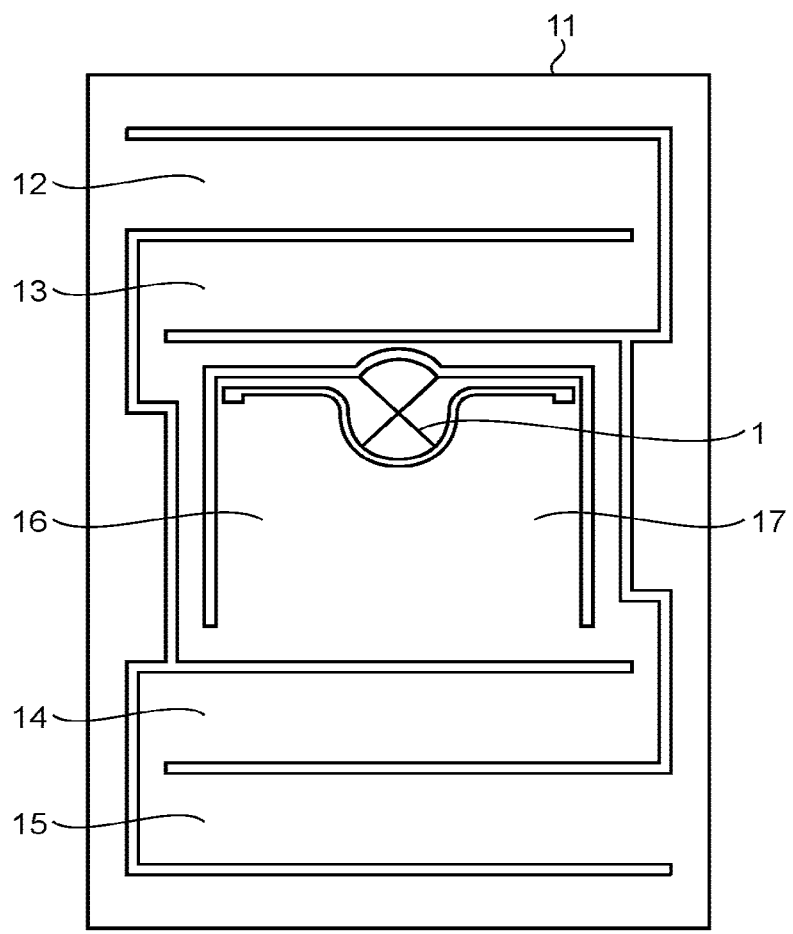
FIG. 1 is a diagram illustrating a configuration example of a frame of a piezoelectric actuator.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a drive system enabling the driving by a single supply without increasing cost substantially.

Exemplary embodiments of the present invention will be described in detail below on the basis of accompanying drawings. Incidentally, the embodiments described below are preferred embodiments of the present invention, and therefore various technically preferred limitations are put thereon; however, the scope of the present invention is not unjustly limited by the following description, and all the configurations described in the embodiments are not constituent elements essential for the present invention.

As described above, an actuator using a piezoelectric element according to conventional technologies has a problem that a negative supply is required structurally, which results in a substantial increase in cost. Furthermore, in the conventional configuration, there is also a problem that it is not possible to apply an arbitrary voltage to a common electrode part. Moreover, in the conventional technologies, only a relatively positive voltage is applied to drive the piezoelectric element; in this case, there exists a problem that characteristics of the actuator cannot be corrected.

Figure 2:
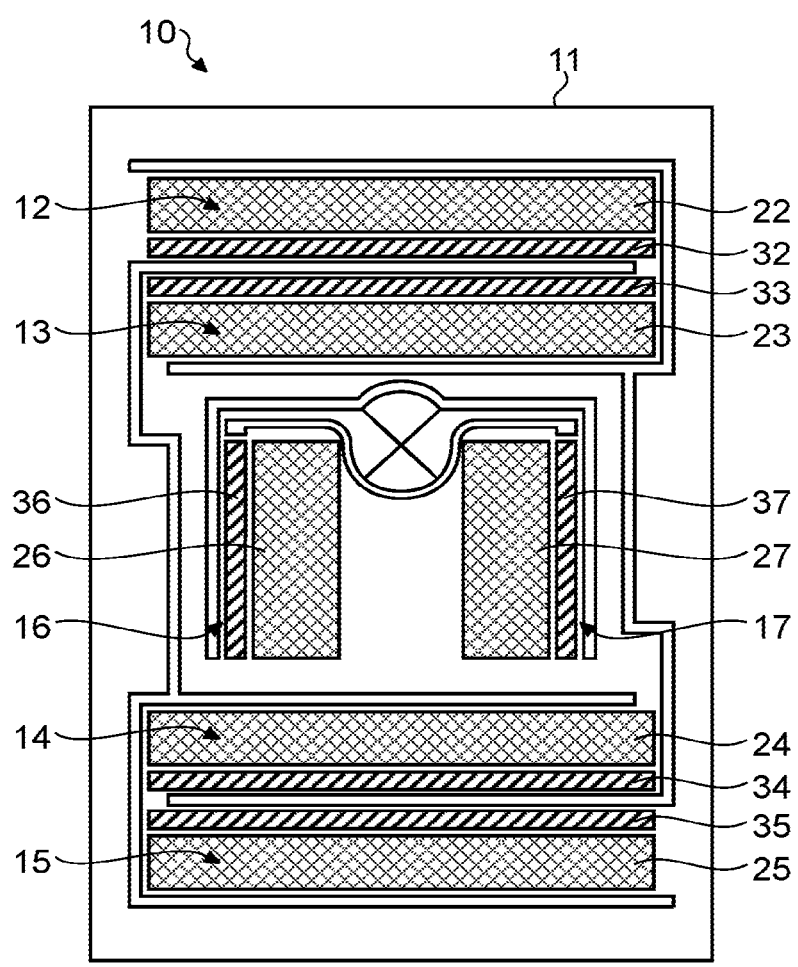
FIG. 2 is a diagram illustrating an example of the arrangement of piezoelectric elements of the piezoelectric actuator.
Figure 3:
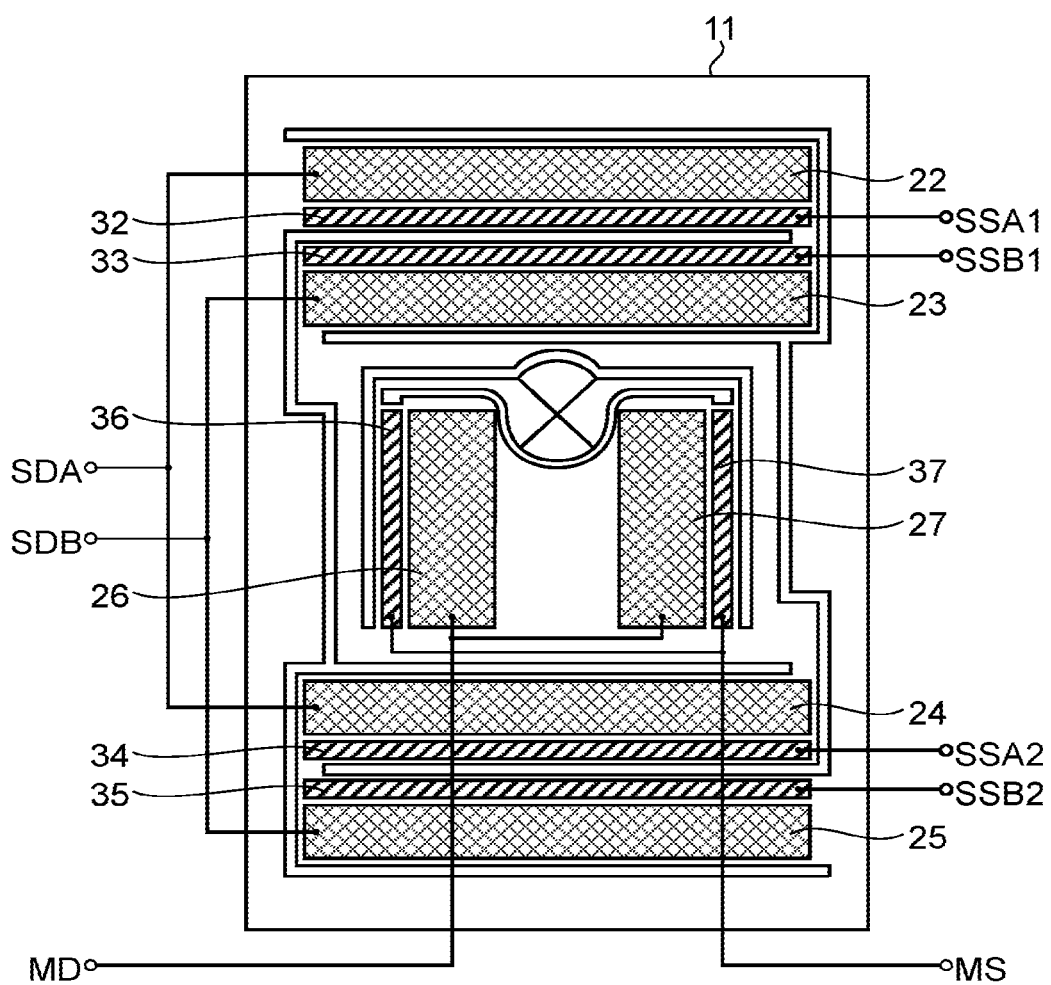
FIG. 3 is a diagram illustrating an example of the connection to the piezoelectric actuator.

Here, the structural example and operation of a piezoelectric actuator will be explained below as an example. FIG. 1 is a diagram illustrating an example of a frame configuration of the piezoelectric actuator. FIG. 2 is a diagram illustrating an example of the arrangement of piezoelectric elements in the frame illustrated in FIG. 1. FIG. 3 is a diagram illustrating an example of the wiring to the piezoelectric actuator illustrated in FIG. 2. The piezoelectric actuator illustrated in FIGS. 1 to 3 is an actuator for scanning a light in two axial directions: an X-axis direction and a Y-axis direction.

As illustrated in FIG. 1, the frame configuration of the piezoelectric actuator has a structure in which a mirror 1 is attached to a frame 11 of the piezoelectric actuator formed on a silicon substrate. The frame 11 includes turn structure parts 12 to 15 and X-axis frames 16 and 17. The left side of the turn structure part 12 is a part connecting to the frame 11; the left side of the turn structure part 13 is a part connecting to the X-axis frames 16 and 17; the right side of the turn structure part 14 is a part connecting to the X-axis frames 16 and 17; and the right side of the turn structure part 15 is a part connecting to the frame 11. FIG. 1 illustrates an example in which the number of turns of each of the turn structure parts 12 to 15 is one; however, the turn structure can be configured to have two or more turns. The turn structure parts 12 to 15 rotate the X-axis frames 16 and 17 in a direction of twisting the entire X-axis frames 16 and 17. The mirror 1 is installed in the rotating center of the X-axis frames 16 and 17, and scans an emitted light, such as a laser beam. In FIG. 1, the Y-axis direction of the scanning is a direction perpendicular to a vertical center line through the mirror 1, i.e., a crosswise direction. The X-axis frames 16 and 17 are also connected to the mirror 1. In FIG. 1, the X-axis direction of the scanning is a direction perpendicular to a horizontal center line through the mirror 1, i.e., a vertical direction. Therefore, in the case of FIG. 1, the vertical direction of the plane of drawing is the X-axis, and the crosswise direction is the Y-axis.

As illustrated in FIG. 2, a piezoelectric actuator 10 has a structure in which driving piezoelectric elements 22 to 25 and detection piezoelectric elements 32 to 35 are disposed on the turn structure parts 12 to 15 of the frame 11 illustrated in FIG. 1, respectively. Furthermore, driving piezoelectric elements 26 and 27 and detection piezoelectric elements 36 and 37 are disposed on the X-axis frames 16 and 17, respectively.

As illustrated in FIG. 3, wiring SDA (Sub Drive Ach) for driving the piezoelectric elements 22 and 24, wiring SDB (Sub Drive Bch) for driving the piezoelectric elements 23 and 25, wiring MD (Main Drive) for driving the piezoelectric elements 26 and 27, a detection terminal SSA1 (Sub Sense Ach-1) coupled to the turn structure part 12, a detection terminal SSB1 (Sub Sense Bch-1) coupled to the turn structure part 13, a detection terminal SSA2 (Sub Sense Ach-2) coupled to the turn structure part 14, and a detection terminal SSB2 (Sub Sense Bch-2) coupled to the turn structure part 15 are disposed on the piezoelectric actuator 10 illustrated in FIG. 2.

Figure 4:
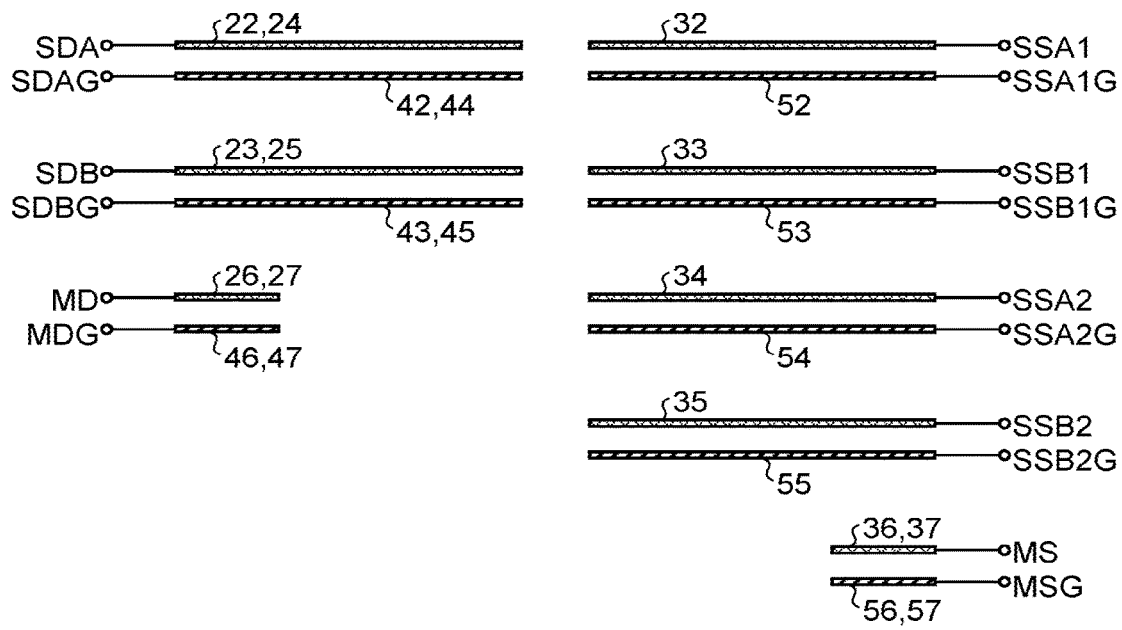
FIG. 4 is a diagram illustrating an example of the arrangement of electrodes in the piezoelectric actuator.

FIG. 4 illustrates an example of the combination of each piezoelectric element illustrated in FIG. 2 and an electrode disposed on the back surface of the piezoelectric element and wiring coupled to the electrode. As illustrated in FIG. 4, electrodes 42 and 44 coupled to common wiring SDAG are arranged on the back surfaces of the driving piezoelectric elements 22 and 24; electrodes 43 and 45 coupled to common wiring SDBG are arranged on the back surfaces of the piezoelectric elements 23 and 25; and electrodes 46 and 47 coupled to common wiring MDG are arranged on the back surfaces of the piezoelectric elements 26 and 27. Furthermore, an electrode 52 coupled to wiring SSA1G is arranged on the back surface of the detection piezoelectric element 32; an electrode 53 coupled to wiring SSB1G is arranged on the back surface of the piezoelectric element 33; an electrode 54 coupled to wiring SSA2G is arranged on the back surface of the piezoelectric element 34; an electrode 55 coupled to wiring SSB2G is arranged on the back surface of the piezoelectric element 35; and electrodes 56 and 57 coupled to common wiring MSG are arranged on the back surfaces of the piezoelectric elements 36 and 37.

Generally, if a voltage of the same polarity as the voltage applied at the time of polarization is applied to a piezoelectric element, a pull force is generated in the piezoelectric element. For example, if a voltage of GND-based +30 V is applied at the time of polarization, by applying a voltage of GND-based positive polarity, the entire piezoelectric element deforms in a contracting direction. This generates a pull force in the piezoelectric element. Furthermore, if a force is put on the piezoelectric element, a weak voltage is generated. This voltage makes the piezoelectric element charged, and an electric current flows between the piezoelectric element and an electrode. Using these characteristics, the piezoelectric elements 22 to 27 and the piezoelectric elements 32 to 37 perform the driving and detection.

FIGS. 1 to 4 illustrate the case where the piezoelectric elements are arranged on only one of the surfaces; alternatively, the piezoelectric elements can be arranged on both surfaces in order to improve the flexibility in the creation of routing of layout or piezoelectric elements. Furthermore, the formation of these piezoelectric elements and electrodes roughly conforms to semiconductor processes, and therefore it is possible to achieve the cost reduction resulting from the mass production.

Figure 5:
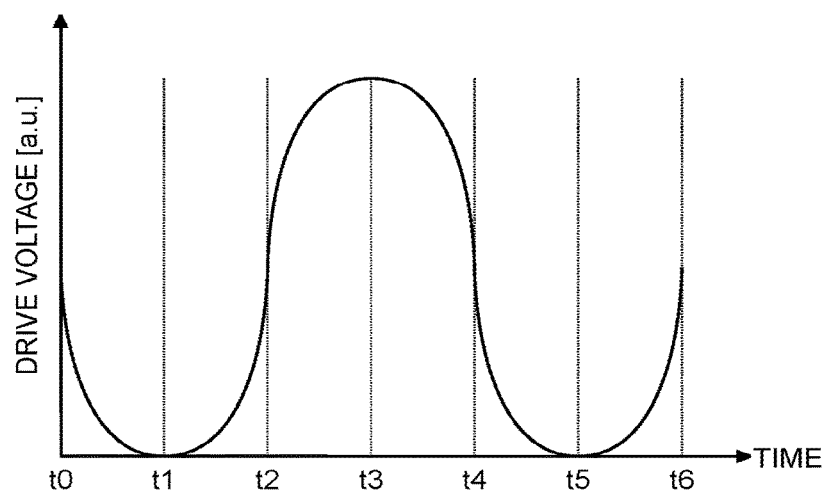
FIG. 5 is a diagram illustrating drive voltage on the X-axis side of the piezoelectric actuator.
Figure 6:
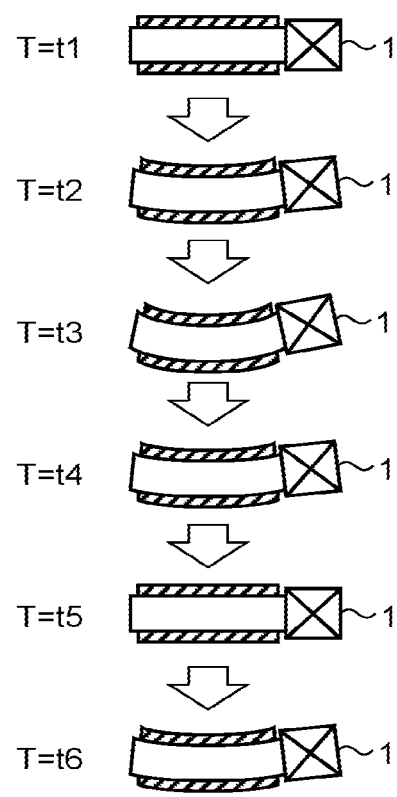
FIG. 6 is a schematic diagram representing the operation of the piezoelectric actuator with respect to the drive voltage illustrated in FIG. 5.

FIG. 5 is a diagram explaining the operation of the piezoelectric actuator 10 in the X-axis direction. FIG. 6 is a diagram of the piezoelectric actuator 10 viewed from the side. Generally, a piezoelectric actuator is operated in the X-axis direction by resonance in order to obtain as large amplitude as possible with low input energy.

Therefore, in FIGS. 5 and 6, the piezoelectric actuator 10 is operated at resonant frequency. As illustrated in FIG. 5, at time t1, a voltage between the electrodes MD and MDG is zero. In the piezoelectric actuator 10 at this time t1, as illustrated in FIG. 6, a displacement of piezoelectric elements on the left side of the mirror 1 is zero. At time t2, the piezoelectric elements deform in a direction of contracting in the center thereof, thereby the center of the mirror 1 slightly tilts to the left. At time t3, the contraction of the piezoelectric elements reaches a maximum, as a result, the center of the mirror 1 tilts to the left at the maximum. In this way, the piezoelectric actuator 10 operates in the X-axis direction.

Figure 7:
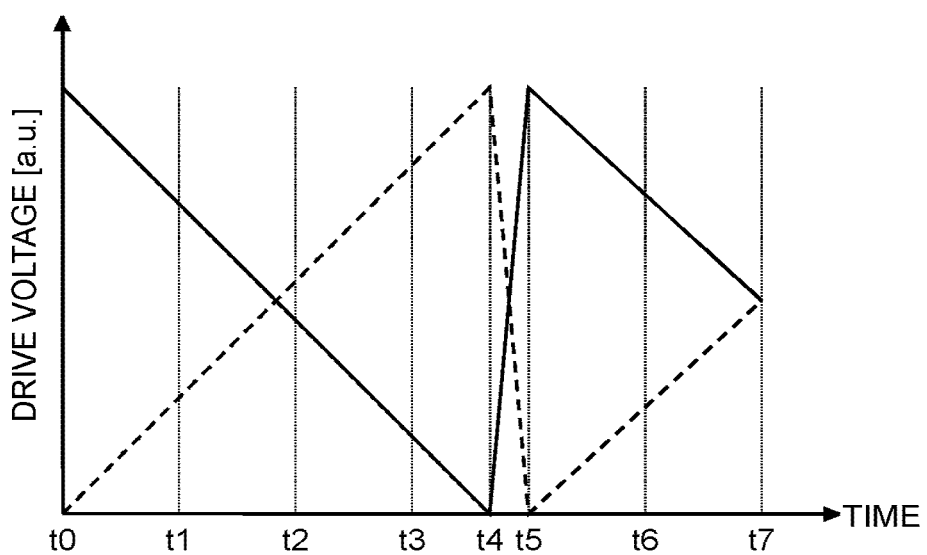
FIG. 7 is a diagram illustrating drive voltage on the Y-axis side of the piezoelectric actuator.
Figure 8:
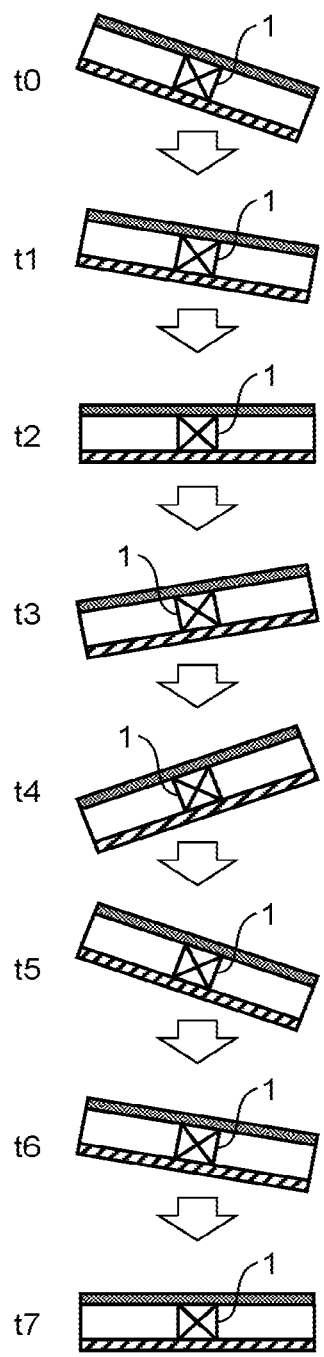
FIG. 8 is a schematic diagram representing the operation of the piezoelectric actuator with respect to the drive voltage illustrated in FIG. 7.

FIG. 7 is a diagram explaining the operation of the piezoelectric actuator 10 in the Y-axis direction. FIG. 8 is a diagram of the piezoelectric actuator 10 viewed from the bottom. In FIG. 7, a solid line indicates a voltage waveform of voltage between the electrodes SDA and SDAG, and a dashed line indicates a voltage waveform of voltage between the electrodes SDB and SDBG. These waveforms are 180-degree phase-reversal saw-tooth waves. At time t0, the voltage between the electrodes SDA and SDAG reaches a maximum, and the voltage between the electrodes SDB and SDBG is zero. The mirror 1 at this time (the time t0), as illustrated in FIG. 8, tilts to the tight at the maximum around the mirror 1. At time t1, the voltage between the electrodes SDA and SDAG becomes approximately one-quarter of the maximum voltage, and the voltage between the electrodes SDB and SDBG becomes approximately three-quarters of the maximum voltage, and the tilt of the mirror 1 becomes roughly intermediate between the maximum tilt and horizontal. At time t2, the voltage between the electrodes SDA and SDAG and the voltage between the electrodes SDB and SDBG both become approximately one-half of the maximum voltage, and the tilt of the mirror 1 becomes nearly horizontal. At time t3, the voltage between the electrodes SDA and SDAG becomes approximately three-quarters of the maximum voltage, and the voltage between the electrodes SDB and SDBG becomes approximately one-quarter of the maximum voltage, and the tilt of the mirror 1 becomes roughly intermediate between the maximum tilt in a direction opposite to the maximum tilt at the time t0 and horizontal. At time t4, the voltage between the electrodes SDA and SDAG becomes zero, and the voltage between the electrodes SDB and SDBG reaches a maximum, and the tilt of the mirror 1 becomes the maximum tilt in a direction opposite to the maximum tilt at the time t0. At time t5, the voltage between the electrodes SDA and SDAG reaches a maximum, and the voltage between the electrodes SDB and SDBG becomes zero, and the mirror 1 tilts to the right at the maximum just like at the time t0.

Figure 9:
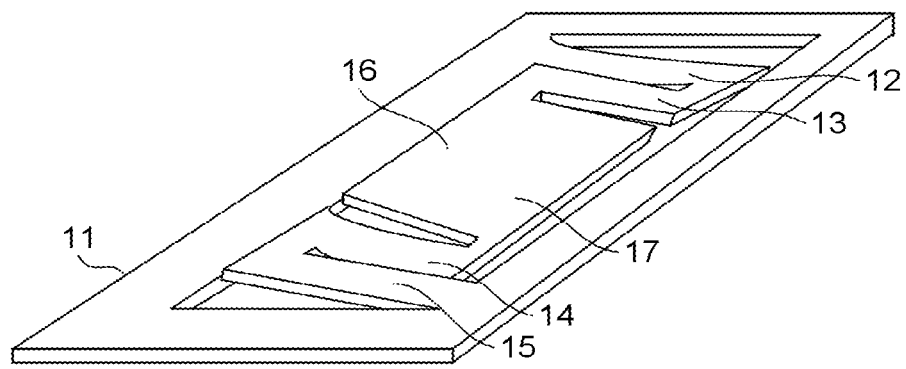
FIG. 9 is a diagram explaining the shape of the piezoelectric actuator while the Y-axis side of the piezoelectric actuator is in operation (Example 1)
Figure 10:
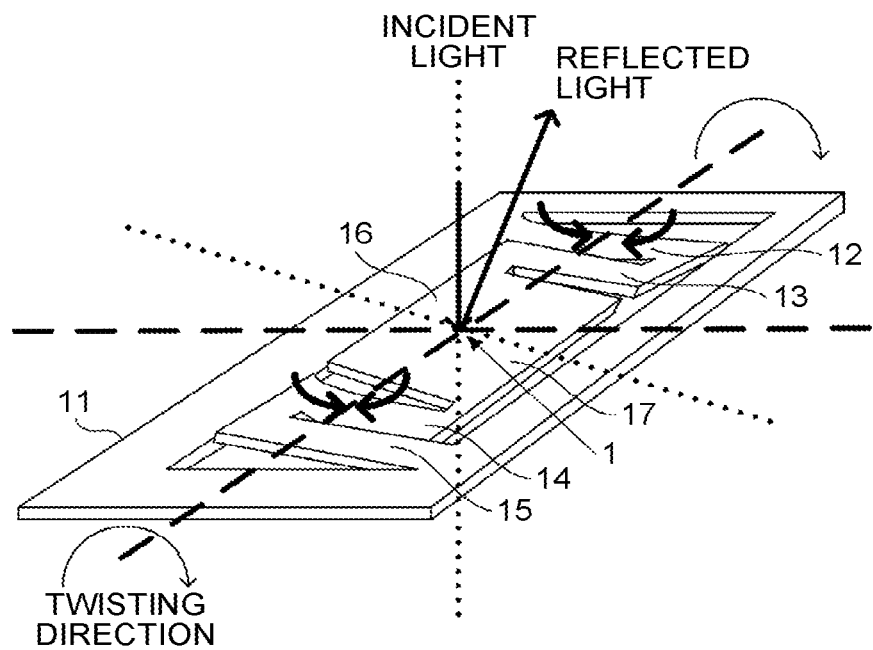
FIG. 10 is a diagram illustrating a scanning direction in the shape illustrated in FIG. 9 and a relationship between the scanning and drawing areas and an emission line of light.
Figure 11:
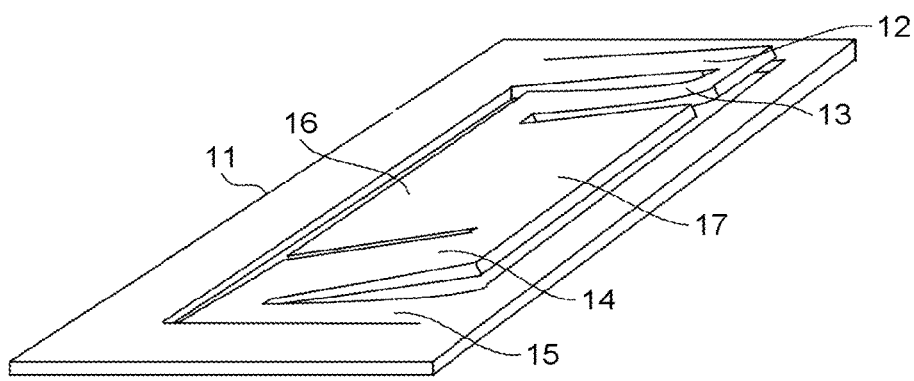
FIG. 11 is a diagram explaining the shape of the piezoelectric actuator while the Y-axis side of the piezoelectric actuator is in operation (Example 2)
Figure 12:
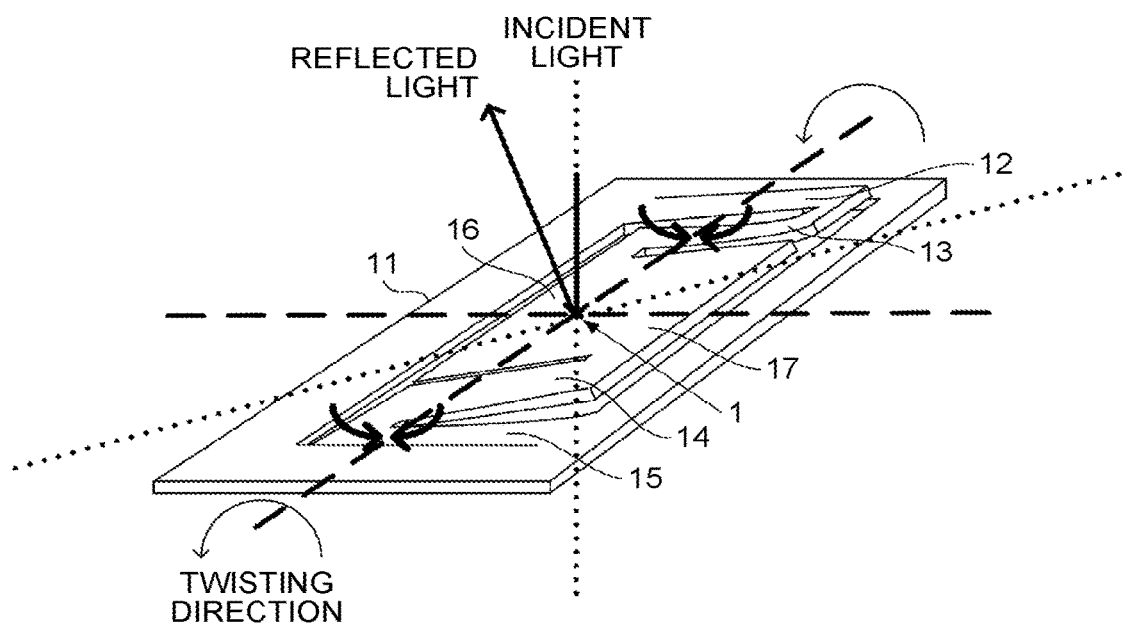
FIG. 12 is a diagram illustrating a scanning direction in the shape illustrated in FIG. 11 and a relationship between the scanning and drawing areas and an emission line of light.

FIGS. 9 to 12 are diagrams explaining the operation of the piezoelectric actuator 10 in the Y-axis direction, and are diagrams of the operation in FIG. 8 when viewed sterically. FIG. 9 is a diagram illustrating the state of the piezoelectric actuator at the times t0 and t5 illustrated in FIG. 8, and illustrates the electrode SDA, i.e., the case where the piezoelectric elements 22 and 24 belonging to Ach contract to the maximum. FIG. 11 is a diagram illustrating the state at the time t4 in FIG. 8, and illustrates the electrode SDB, i.e., the case where the piezoelectric elements 23 and 25 belonging to Bch contract to the maximum. FIGS. 10 and 12 are diagrams illustrating detailed explanation for FIGS. 9 and 11, respectively. As can be seen from FIGS. 9 to 12, when a light enters the mirror 1, the reflected light scans in the Y-axis direction (horizontal direction). When such a piezoelectric actuator is applied to a system such as an optical scanner, light is generally scanned in the Y-axis direction in a linear fashion, i.e., the raster scan operation is generally performed. FIGS. 9 to 12 explain the situation in which the piezoelectric actuator is operated by a raster scan. In this operation, a frequency of applied voltage is about tens of hertz. In the case of handling a general image or video, the piezoelectric actuator is often operated at 60 to 70 Hz.

In the above-described operation, while the piezoelectric actuator 10 is operated in the X-axis direction with as low energy as possible by using resonance phenomena, while being operated in the Y-axis direction by dissonance. Therefore, the amount of displacement of piezoelectric elements in the Y-axis direction is small. So, the turn structure parts 12 to 15 and the X-axis frames 16 and 17 are disposed in the piezoelectric actuator 10, and the multiple piezoelectric elements 22 to 27 are operated in parallel, thereby earning the amount of displacement in the Y-axis direction.

Figure 13:
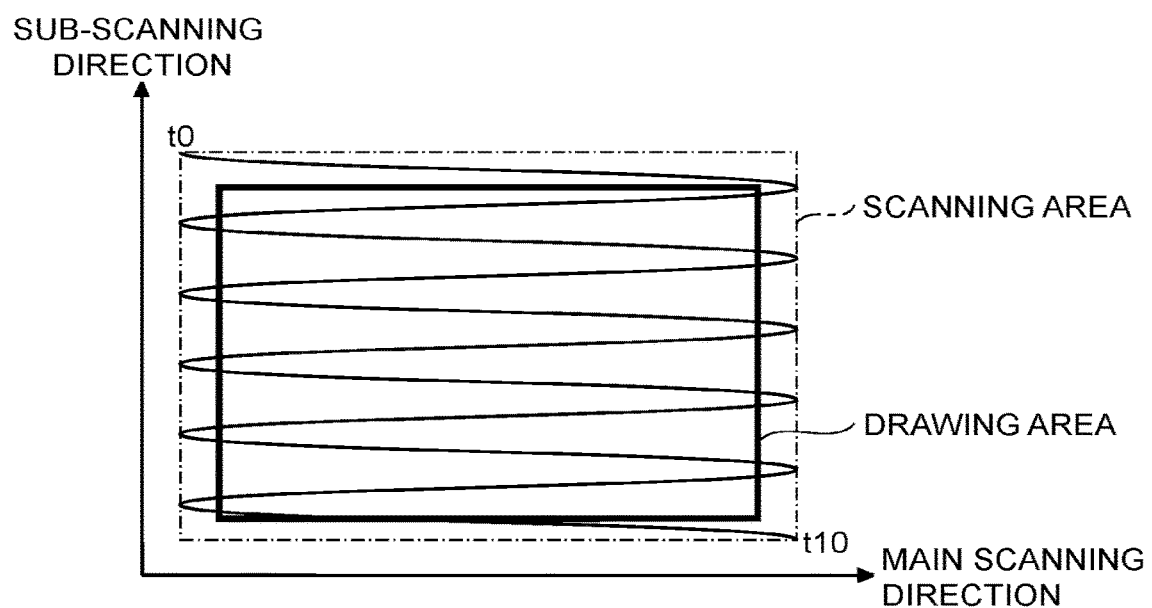
FIG. 13 is a diagram illustrating an operation for drawing a two-dimensional image using the piezoelectric actuator.

FIG. 13 is a diagram illustrating an operation for drawing a two-dimensional image using the piezoelectric actuator 10. As illustrated in FIG. 13, in the drawing a two-dimensional image, scanning of one screen starts from the upper left corner of a scanning area at time t0, and ends when the scanning light has reached the lower right corner of the scanning area at time t10.

In the above, the piezoelectric actuator 10 having a so-called cantilever structure is described as an example; however, the structure of the piezoelectric actuator 10 is not limited to this. That is, any piezoelectric actuators having various different structures can be applied in the embodiments described below.

Figure 14:
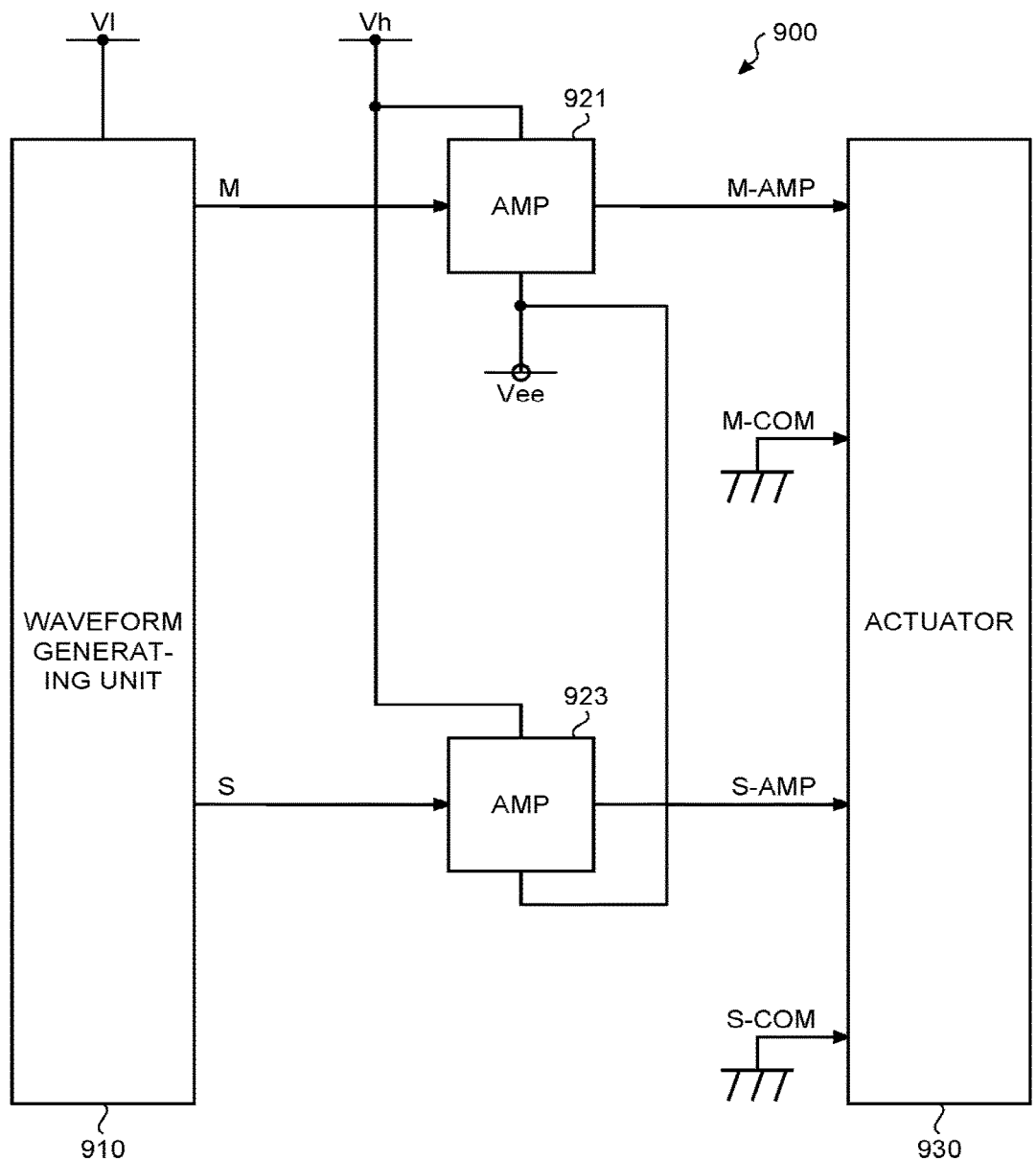
FIG. 14 is a diagram illustrating a schematic configuration example of an actuator driving device as a comparative example.

FIG. 14 is a diagram illustrating a schematic configuration example of an actuator driving device as a comparative example. As illustrated in FIG. 14, an actuator driving device 900 includes a waveform generating unit 910, amplifiers 921 and 923, and an actuator 930. The waveform generating unit 910 outputs a main-scanning drive voltage M to the amplifier 921, and outputs a sub-scanning drive voltage S to the amplifier 923. A negative supply Vee and a positive supply Vcc for voltage higher than the required maximum output voltage are used in each of the amplifiers 921 and 923 so that voltage ranging from 0 V to the required maximum output voltage can be obtained. An output M-AMP (main scanning) of the amplifier 921 and an output S-AMP (sub-scanning) of the amplifier 923 are connected to a drive unit of the actuator 930. Common electrodes M-COM and S-COM of the actuator 930 are coupled to GND.

Figure 15:
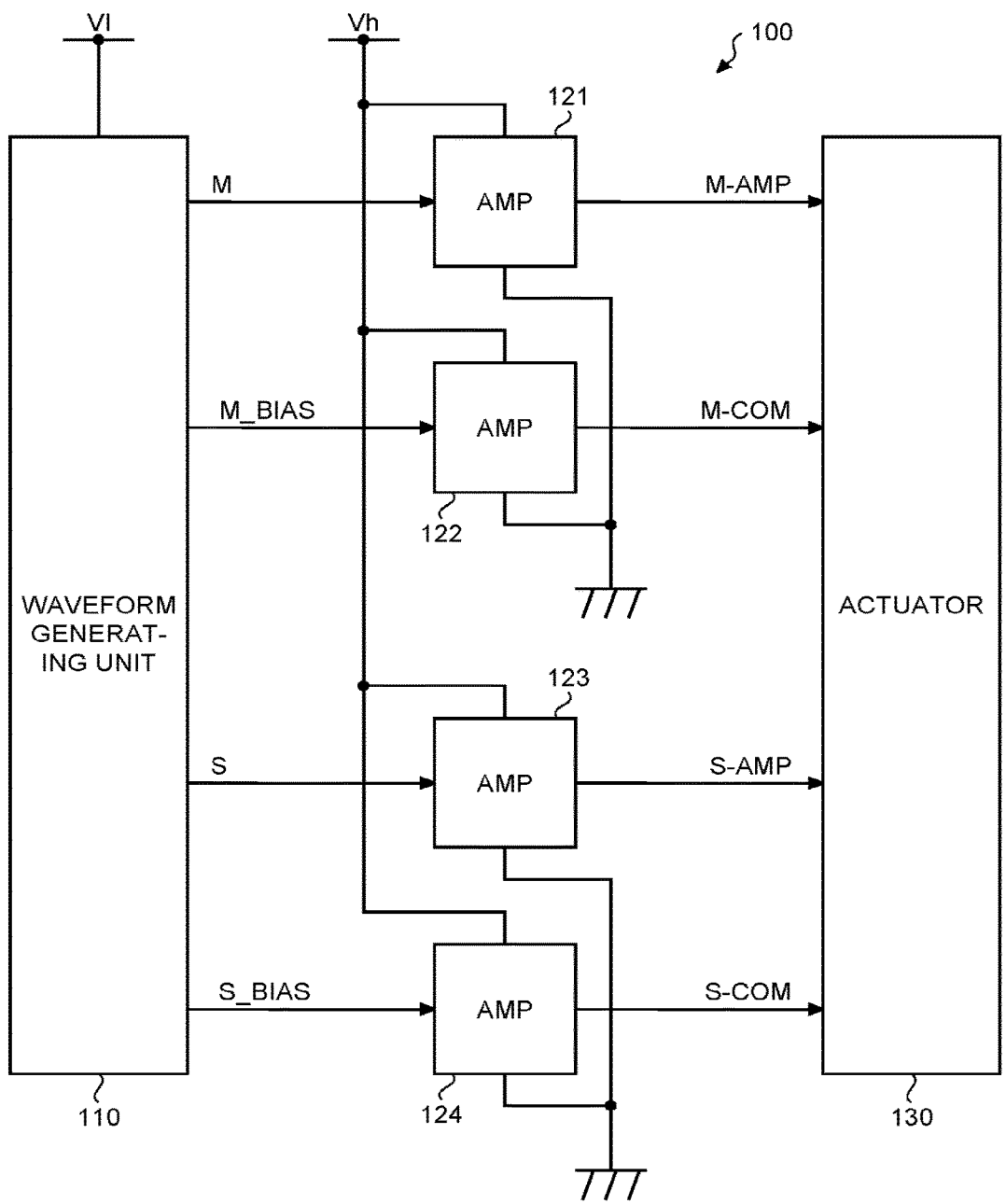
FIG. 15 is a circuit diagram illustrating a schematic configuration example of a drive system according to a first embodiment.

Subsequently, a drive system and drive control method of an actuator according to a first embodiment are explained in detail with accompanying drawings. FIG. 15 is a block diagram illustrating a schematic configuration example of the drive system according to the first embodiment. As illustrated in FIG. 15, a drive system 100 includes a waveform generating unit 110, a main-scanning driving amplifier 121, a main-scanning common-electrode-driving amplifier (also referred to as a main-scanning bias amplifier) 122, a sub-scanning driving amplifier 123, a sub-scanning common-electrode-driving amplifier (also referred to as a sub-scanning bias amplifier) 124, and an actuator 130. The actuator 130 includes, for example, piezoelectric elements as a drive unit of the actuator 130. A power supply (a low voltage supply) V1 is supplied to the waveform generating unit 110, and a first power-supply voltage Vh (a high voltage supply) is supplied to the amplifiers 121 to 124. In the first embodiment, unlike the comparative example illustrated in FIG. 14, low voltage supplies of all the amplifiers 121 to 124 are coupled to GND.

The drive system 100 having such a configuration enables the driving by a single supply without requiring a negative supply. Accordingly, it is possible to suppress an increase in cost. In the first embodiment, a voltage of a common electrode part is the same potential as the minimum voltage of a drive voltage in the main scanning (a first direction), and is the negative potential in the sub-scanning (a second direction). Details of this are explained below with accompanying drawings.

Figure 16:
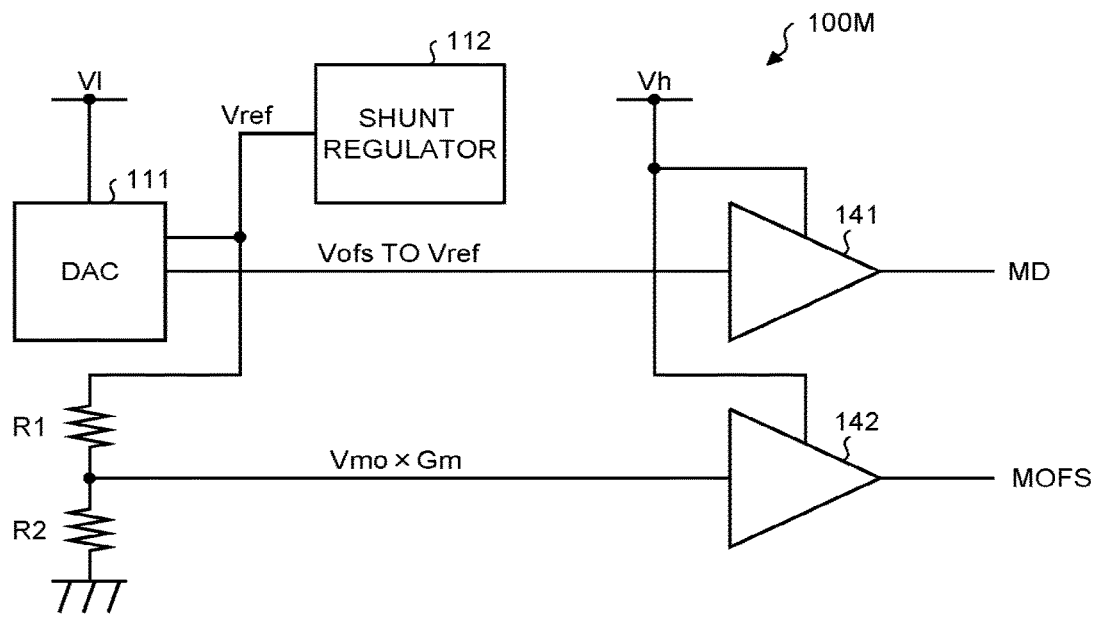
FIG. 16 is a circuit diagram illustrating a main-scanning drive circuit for main-scanning driving and common electrode driving in the drive system illustrated in FIG. 15.

FIG. 16 is a circuit diagram illustrating a main-scanning drive circuit M for the main-scanning driving and the main-scanning common-electrode driving in the drive system 100. As illustrated in FIG. 16, the main-scanning drive circuit 100M includes a digital-to-analog converter (DAC) 111, a shunt regulator 112, an amplifier 141, and a buffer 142. The shunt regulator 112 generates a reference voltage Vref with high accuracy, and inputs the reference voltage Vref to the DAC 111. A power-supply voltage of the DAC 111 is V1 [V]. The reference voltage Vref is divided by resistances R1 and R2, and a voltage Vmo [V] is generated. This voltage Vmo is buffered and output as an output MOFS by the buffer 142; at this time, it is set so as to equal to a voltage Vmo×Gm, which is obtained by multiplying the voltage Vmo by a gain Gm of the driving-side amplifier 141.

An output MD of the amplifier 141 corresponds to the output M-AMP in FIG. 15, and the output MOFS of the buffer 142 corresponds to the output M-COM in FIG. 15.

Figure 17:
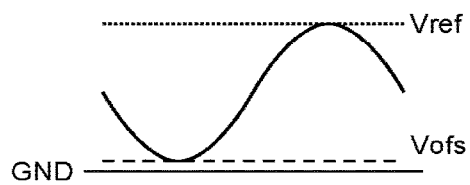
FIG. 17 is a diagram illustrating an example of an output waveform of a DAC illustrated in FIG. 16.
Figure 18:
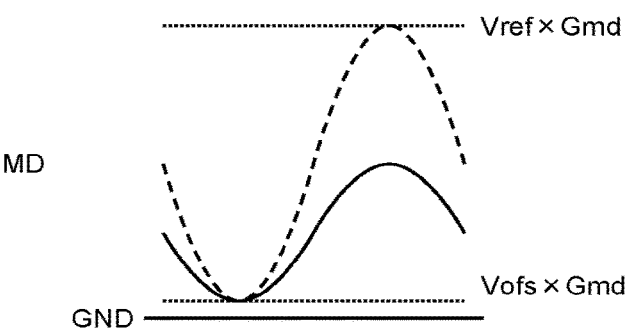
FIG. 18 is a diagram illustrating an example of an output waveform of an amplifier illustrated in FIG. 16.

Here, the DAC 111 can output voltage ranging from GND level up to the reference voltage Vref in general; however, in the case of using no negative supply as described above, the voltage ranging from GND level up to the reference voltage Vref cannot be output as the output of the amplifier 141. However, in the case where the output is used in a single supply, it is possible to output voltage ranging from some degree of voltage higher than GND. Therefore, in the first embodiment, as illustrated in FIG. 17, the output range of the DAC 111 is from some degree of voltage Vofs higher than GND to the reference voltage Vref. In this case, when the gain of the driving amplifier 141 is denoted by Gmd, as illustrated in FIG. 18, the output of the amplifier 141 is in a range from a voltage Vofs×Gmd to a voltage Vref×Gmd, and the minimum voltage becomes equal to the voltage Vmo×Gm of the common electrode part. Accordingly, even when there is no negative supply, the same driving in the main scanning as the conventional technologies is enabled.

Figure 19:
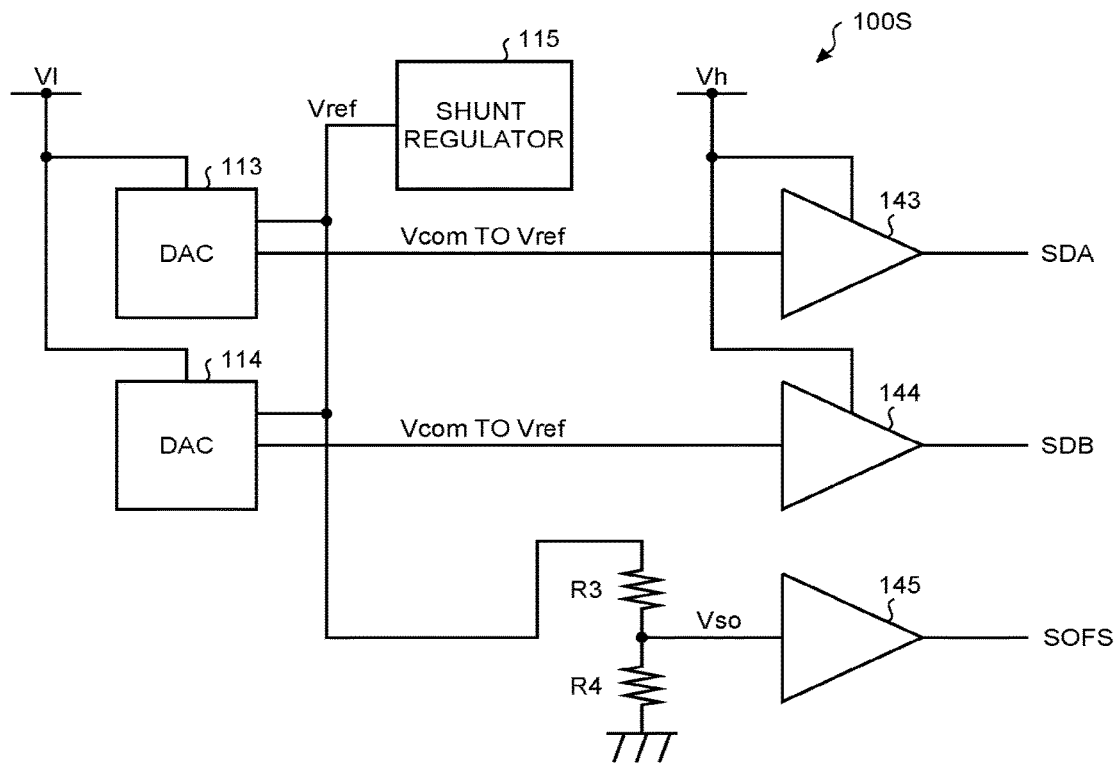
FIG. 19 is a circuit diagram illustrating a sub-scanning drive circuit for sub-scanning driving and common electrode driving in the drive system illustrated in FIG. 15.

FIG. 19 is a circuit diagram illustrating a sub-scanning drive circuit 100S for the sub-scanning driving and the sub-scanning common-electrode driving in the drive system 100. As illustrated in FIG. 19, the sub-scanning drive circuit 100S includes DACs 113 and 114, a shunt regulator 115, and amplifiers 143 to 145. The shunt regulator 115 generates a reference voltage Vref with high accuracy, and inputs the reference voltage Vref to the DACs 113 and 114. The shunt regulator 112 used in the main-scanning drive circuit 100M can be shared as the shunt regulator 115. A power-supply voltage of the DACs 113 and 114 is V1 [V]. As described above, the sub-scanning requires two drive systems with different polarities from each other. Therefore, the sub-scanning drive circuit 100S illustrated in FIG. 19 includes two drive systems: an output Sub Drive A (hereinafter, referred to as SDA) and the other is an output Sub Drive B (hereinafter, referred to as SDB). The reference voltage Vref is divided by resistances R3 and R4, and a voltage Vso [V] is generated. This voltage Vso is increased by a gain Gso of the amplifier 145 coupled to a connection point between the resistances R3 and R4, and is output as an output SOFS. If this output SOFS is a voltage equal to the output MOFS of the main-scanning drive circuit 100M, the resistances R3 and R4 and the amplifier 145 can be omitted.

Figure 20:
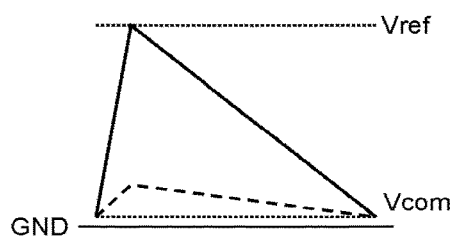
FIG. 20 is a diagram illustrating an example of an output waveform of a DAC illustrated in FIG. 19.
Figure 21:
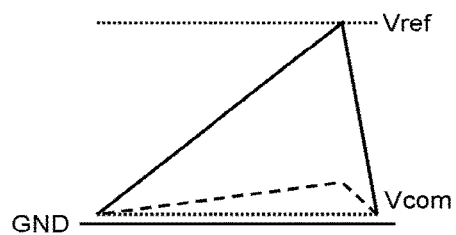
FIG. 21 is a diagram illustrating an example of an output waveform of another DAC illustrated in FIG. 19.
Figure 22:
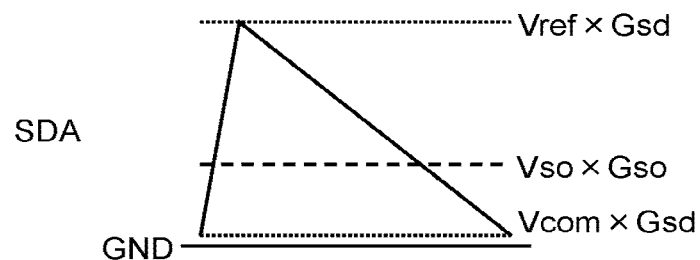
FIG. 22 is a diagram illustrating an example of an output waveform of an amplifier illustrated in FIG. 19.
Figure 23:
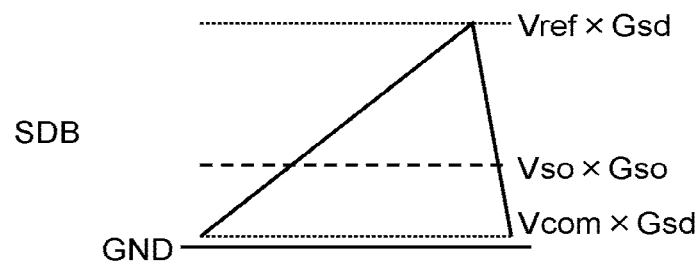
FIG. 23 is a diagram illustrating an example of an output waveform of another amplifier illustrated in FIG. 19.
Figure 24:
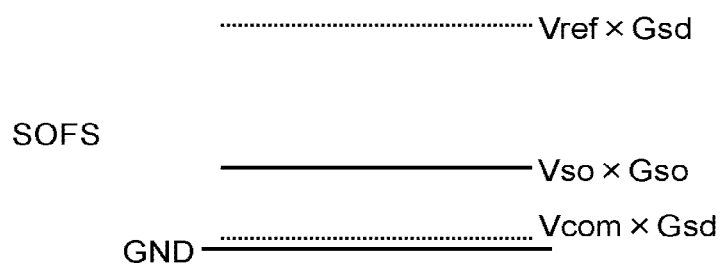
FIG. 24 is a diagram illustrating an example of an output waveform of still another amplifier illustrated in FIG. 19.

Also in the sub-scanning drive circuit 100S, the DACs 113 and 114 can output voltage ranging from GND level up to the reference voltage Vref [V] in general; however, as described above, the voltage ranging from GND level up to the reference voltage Vref cannot be output as the outputs of the amplifiers 143 and 144. However, in the case where the outputs are used in a single supply, it is possible to output some degree of voltage higher than GND. Therefore, just like the main-scanning drive circuit 100M, the output range of the DACs 113 and 114 is from a voltage Vcom to the reference voltage Vref (see FIG. 20 for the DAC 113 and FIG. 21 for the DAC 114). At this time, when the gain of the driving amplifiers 143 to 145 is denoted by Gsd, as illustrated in FIG. 22, the output of the amplifier 143 is in a range from a voltage Vcom×Gsd to a voltage Vref×Gsd, and, as illustrated in FIG. 23, the output of the amplifier 144 is also in the range from the voltage Vcom×Gsd to the voltage Vref×Gsd. On the other hand, the output Vso of the common-electrode-driving amplifier 145 can become an output SOFS illustrated in FIG. 24 by adjusting the resistances R3 and R4 and the gain Gso of the amplifier 145 as described above, so that the output voltage of the sub-scanning bias amplifier 124 is higher than the minimum output voltage (Vcom×Gsd) of the sub-scanning driving amplifier 123. Accordingly, even when there is no negative supply, in the sub-scanning, the common electrode part can be driven in a state of being applied with a relatively negative voltage.

As described above, according to the first embodiment, it is possible to apply a relatively negative voltage to the common electrode part without using a negative supply. Consequently, the driving by a single supply can be achieved without a substantial increase in cost.

Figure 25:
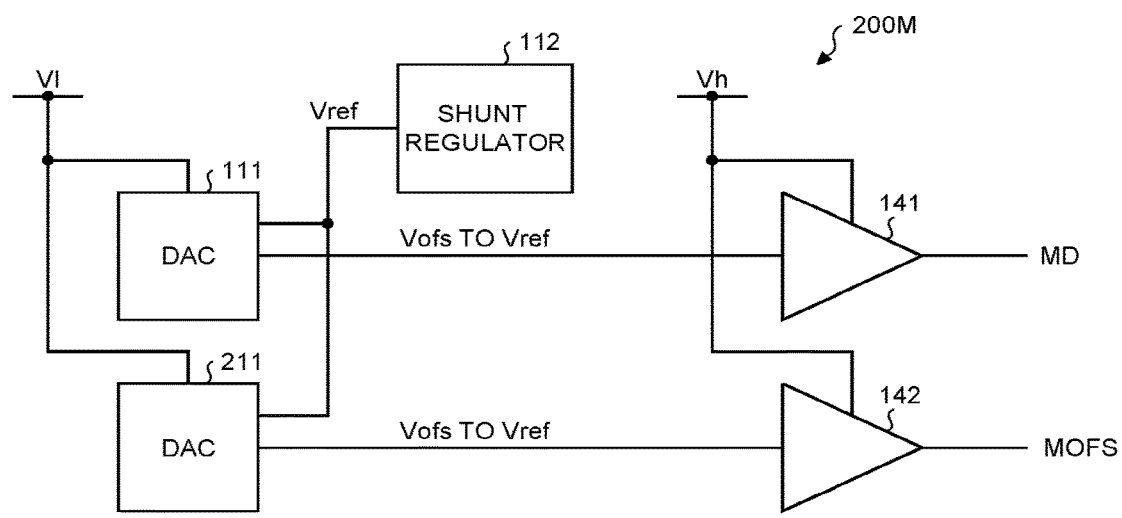
FIG. 25 is a circuit diagram illustrating a main-scanning drive circuit for main-scanning driving and common-electrode driving in a drive system according to a second embodiment.
Figure 26:
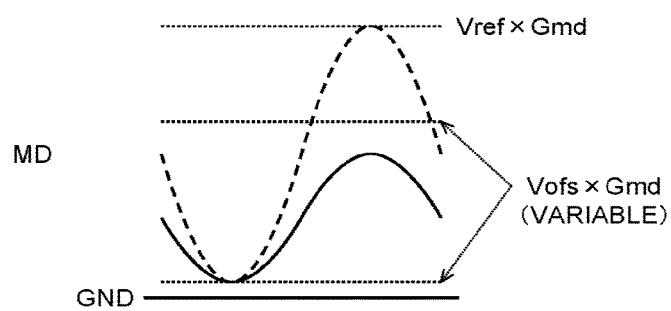
FIG. 26 is a diagram illustrating an example of an output waveform of an amplifier illustrated in FIG. 25.

Next, a drive system and drive control method of an actuator according to a second embodiment are explained in detail with accompanying drawings. In the second embodiment, another form of the main-scanning drive circuit 100M (see FIG. 16) described in the first embodiment is described. FIG. 25 is a circuit diagram illustrating a schematic configuration example of a main-scanning drive circuit 200M according to the second embodiment. As illustrated in FIG. 25, the main-scanning drive circuit 200M has about the same configuration as the main-scanning drive circuit 100M illustrated in FIG. 16, except that the main-scanning drive circuit 200M includes a DAC 211 instead of the resistances R1 and R2. As the main-scanning drive circuit 200M has such a configuration, in the second embodiment, as illustrated in FIG. 26, the voltage of the common-electrode on the main-scanning side is configured to be variable. Therefore, the common-electrode on the main-scanning side can be driven with a relatively negative voltage. Accordingly, a change in the characteristics of the actuator 130 can be corrected appropriately.

As described above, according to the second embodiment, it is possible to appropriately control the bias voltage of the main scanning in the drive system 100 according to the first embodiment. The other configurations and the operation and effects are the same as the first embodiment, so detailed description of these is omitted.

Figure 27:
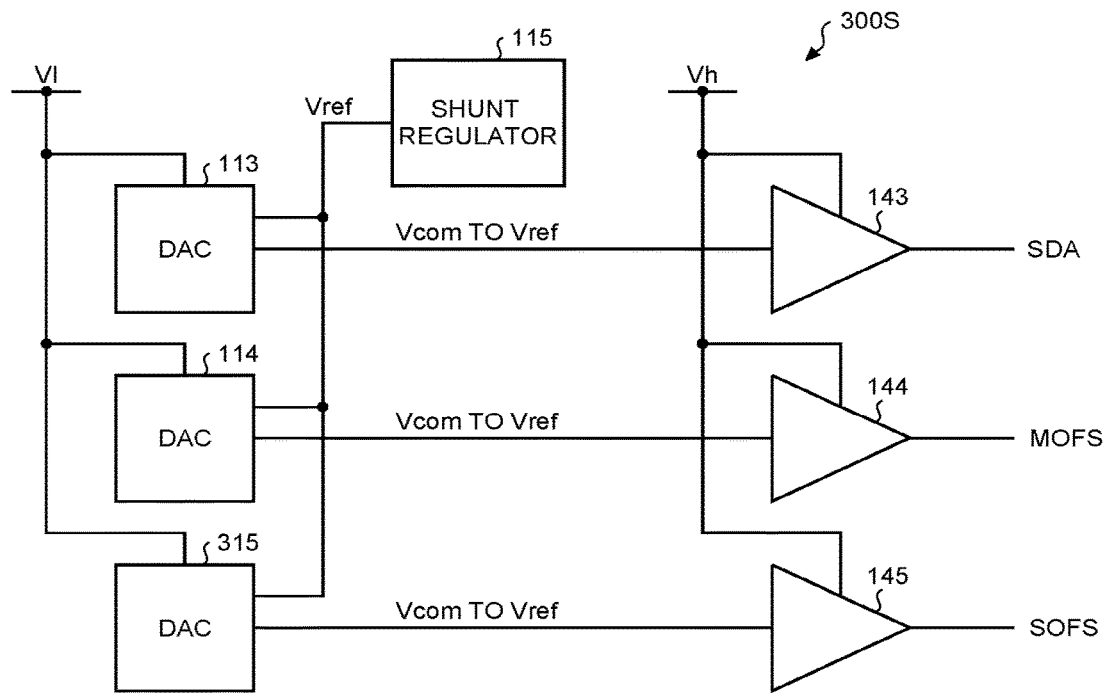
FIG. 27 is a circuit diagram illustrating a sub-scanning drive circuit for sub-scanning driving and common-electrode driving in a drive system according to a third embodiment.
Figure 28:
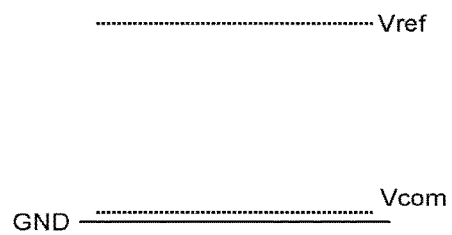
FIG. 28 is a diagram illustrating an example of an output waveform of a DAC illustrated in FIG. 27.
Figure 29:
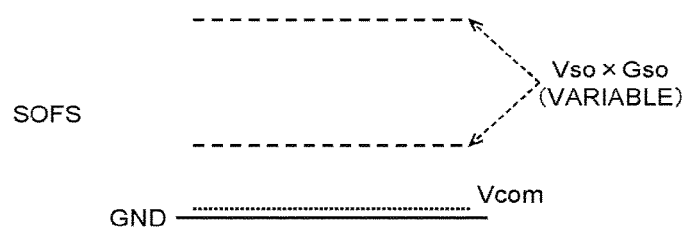
FIG. 29 is a diagram illustrating an example of an output waveform of an amplifier illustrated in FIG. 27.

Next, a drive system and drive control method of an actuator according to a third embodiment are explained in detail with accompanying drawings. In the third embodiment, another form of the sub-scanning drive circuit 100S (see FIG. 19) described in the first embodiment is described. FIG. 27 is a circuit diagram illustrating a schematic configuration example of a sub-scanning drive circuit 300S according to the third embodiment. As illustrated in FIG. 27, the sub-scanning drive circuit 300S has about the same configuration as the sub-scanning drive circuit 100S illustrated in FIG. 19, except that the sub-scanning drive circuit 300S includes a DAC 315 instead of the resistances R3 and R4. The output of the DAC 315 can be any voltage ranging from the voltage Vcom to the reference voltage Vref as illustrated in FIG. 28. As the sub-scanning drive circuit 300S has such a configuration, in the third embodiment, as illustrated in FIG. 29, the voltage of the common electrode on the sub-scanning side is configured to be variable. Therefore, the voltage of the common electrode on the sub-scanning side can be driven by a relatively negative voltage. Accordingly, a change in the characteristics of the actuator 130 can be corrected appropriately.

As described above, according to the third embodiment, it is possible to appropriately control the bias voltage of the sub-scanning in the drive system 100 according to the first embodiment. The other configurations and the operation and effects are the same as the first embodiment, so detailed description of these is omitted.

Next, a drive system and drive control method of an actuator according to a fourth embodiment are explained. In the above-described third embodiment, the voltage of the common electrode on the sub-scanning side is configured to be variable on the basis of the first embodiment; however, the variable object is not limited to this. In the fourth embodiment, the voltages of the common electrodes on both the main scanning side and the sub-scanning side are configured to be variable on the basis of the second embodiment.

The drive system according to the fourth embodiment can be implemented, for example, by integrating the drive system 100 described in the first embodiment, the main-scanning drive circuit 200M described in the second embodiment, and the sub-scanning drive circuit 300S described in the third embodiment. As the drive system according to the fourth embodiment has such a configuration, a change in the characteristics of the actuator 130 can be corrected further appropriately.

Figure 30:
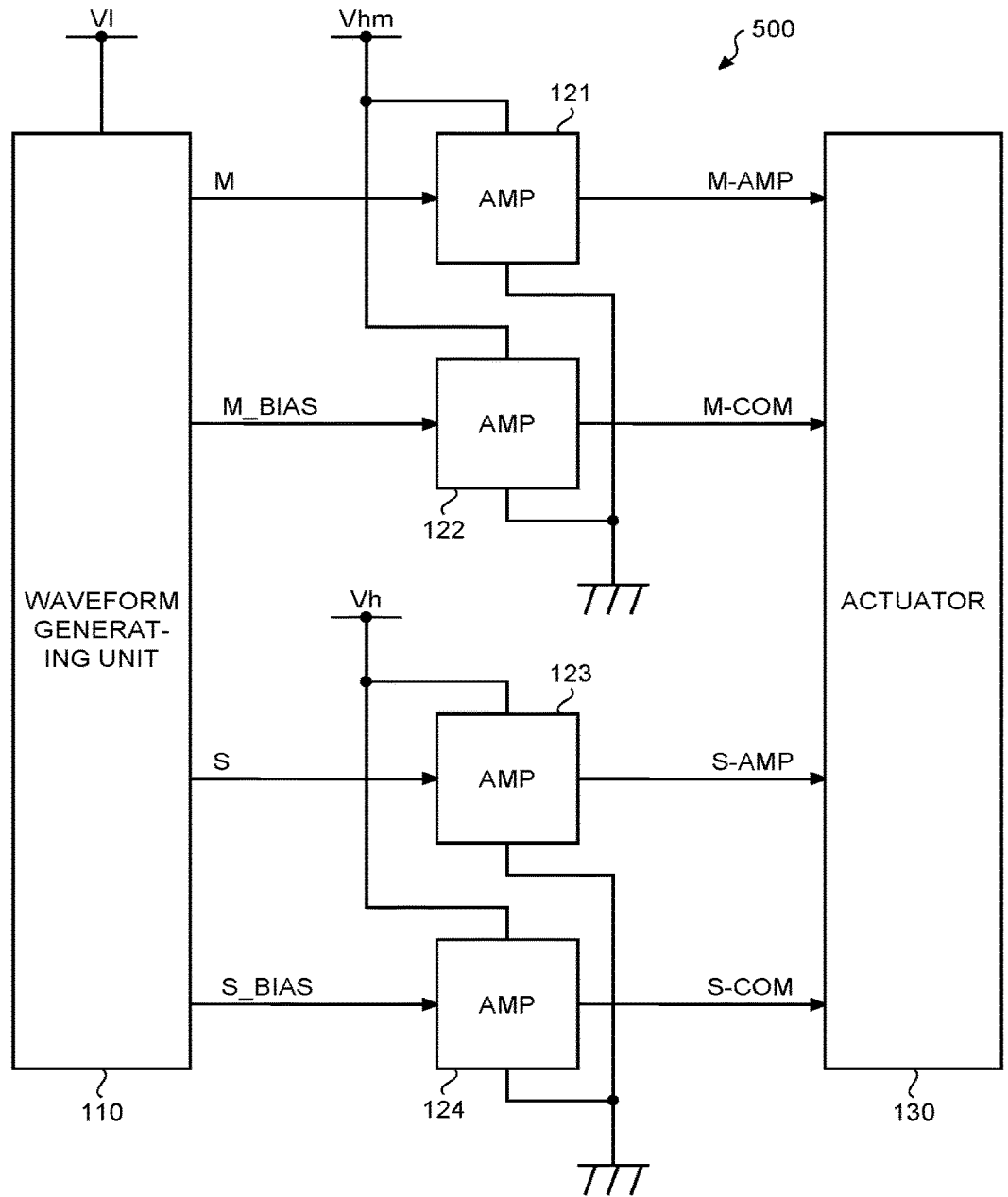
FIG. 30 is a circuit diagram illustrating a schematic configuration example of a drive system according to a fifth embodiment.

Next, a drive system and drive control method of an actuator according to a fifth embodiment are explained in detail with accompanying drawings. FIG. 30 is a circuit diagram illustrating a schematic configuration example of a drive system 500 according to the fifth embodiment. As illustrated in FIG. 30, the drive system 500 has about the same configuration as the drive system 100 illustrated in FIG. 15, except that the drive system 500 supplies a dedicated second power-supply voltage Vhm, which is different from the power-supply voltage Vh supplied to the sub-scanning driving amplifier 123 and the sub-scanning common-electrode-driving amplifier 124, to the main-scanning driving amplifier 121 and the main-scanning common-electrode-driving amplifier 122.

As described above, the piezoelectric actuator 10 is configured to be operated in the main scanning by resonance, and to be driven in the sub-scanning by dissonance. Therefore, the drive voltage of the sub-scanning is comparatively high, and requires, for example, about 50 V. On the other hand, the drive voltage of the main scanning is about 20 to 30 V. Therefore, by providing the dedicated power-supply voltage Vhm for the main scanning, general parts can be used for the main scanning, which makes the cost reduction possible.

Figure 31:
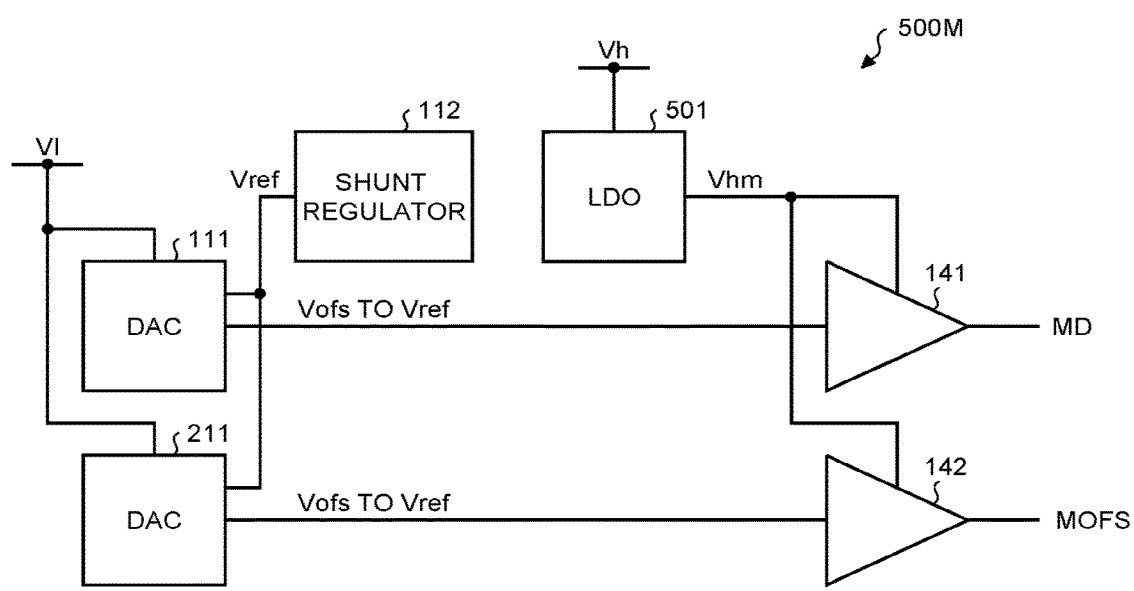
FIG. 31 is a circuit diagram illustrating a main-scanning drive circuit for main-scanning driving and common-electrode driving in the drive system illustrated in FIG. 30.

FIG. 31 is a circuit diagram illustrating a schematic configuration example of a main-scanning drive circuit 500M according to the fifth embodiment. As illustrated in FIG. 31, the main-scanning drive circuit 500M has about the same configuration as the main-scanning drive circuit 200M illustrated in FIG. 25, except that the main-scanning drive circuit 500M further includes a low drop-out (LDO) regulator 501. The LDO regulator 501 lowers the power-supply voltage Vh (the high voltage supply) to the required power-supply voltage Vhm, and supplies the power-supply voltage Vhm to the amplifier 141 and the buffer 142. For example, the LDO regulator 501 lowers a power-supply voltage Vh of 50 V to a power-supply voltage Vhm of about 20 to 30 V, and supplies the power-supply voltage Vhm to the amplifier 141 and the buffer 142. The other configurations and the operation and effects are the same as the first embodiment, so detailed description of these is omitted.

Next, a sixth embodiment is explained. The drive systems and drive control methods described in the above-described embodiments can be also adopted in a video device. Accordingly, it is possible to achieve a sophisticated video device having excellent controllability.

Next, a seventh embodiment is explained. The drive systems described in the first to fifth embodiments can act as a light deflector. Therefore, these drive systems can be incorporated in image projection devices, such as a projector, a head-mounted display, and a head-up display, or mobile devices equipped with the image projection device. As the seventh embodiment, an image projection device equipped with any of the drive systems described in the first to fifth embodiments is explained in detail below with accompanying drawings.

Figure 32:
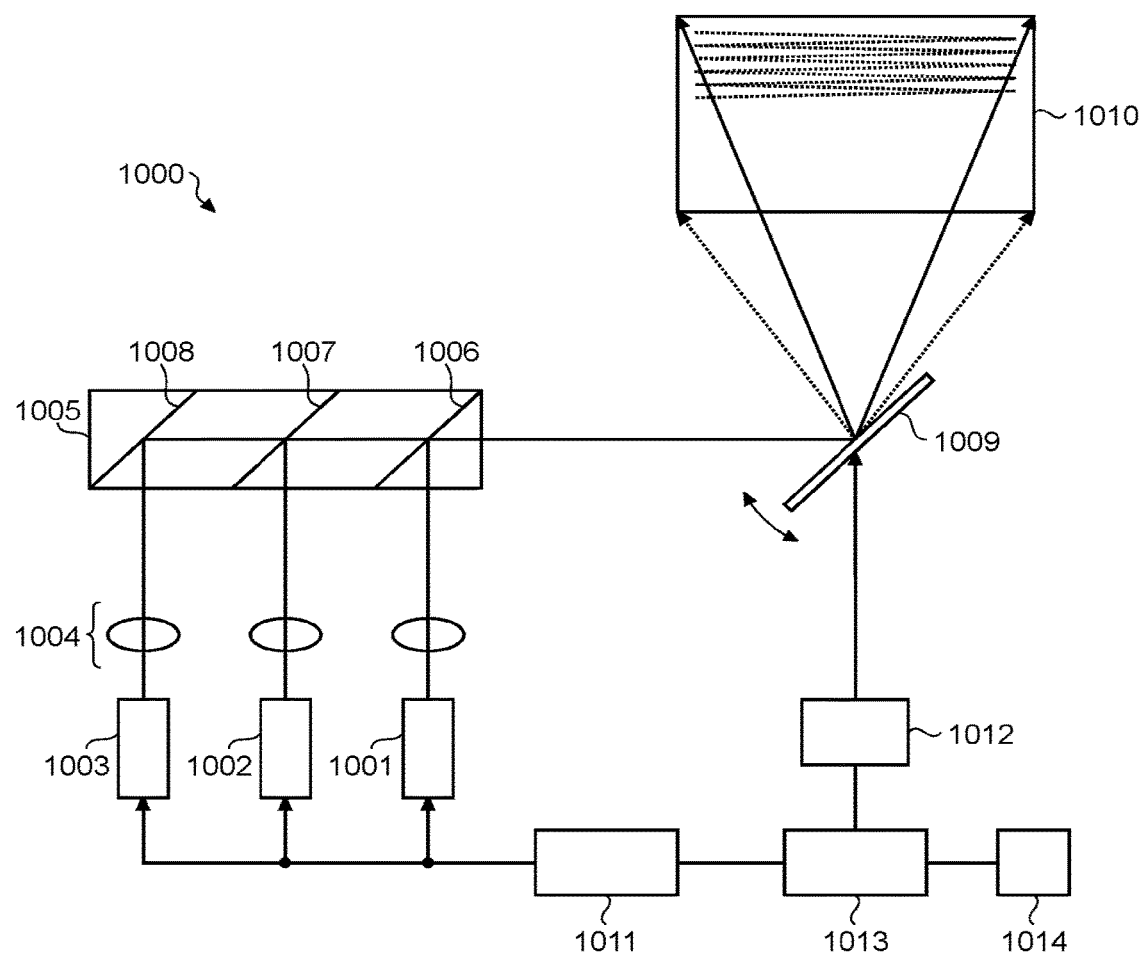
FIG. 32 is a schematic diagram illustrating a schematic configuration example of an image projection device according to a seventh embodiment.

FIG. 32 is a schematic diagram illustrating a schematic configuration example of the image projection device according to the seventh embodiment. As illustrated in FIG. 32, an image projection device 1000 includes a red laser light source 1001, a green laser light source 1002, a blue laser light source 1003, collimator lenses 1004, an optical-paths synthesizing unit 1005, a two-dimensional light deflector 1009, an LD drive unit 1011, a light-deflector drive unit 1012, a control unit 1013, and a storage unit 1014. The drive system according to any of the first to fifth embodiments is incorporated in the light-deflector drive unit 1012.

The collimator lenses 1004 and the optical-paths synthesizing unit 1005 form an optical system that makes laser lights output from the laser light sources 1001 to 1003 enter a reflection mirror 1100 (see FIG. 33) of the two-dimensional light deflector 1009. The lights emitted from the red laser light source 1001, the green laser light source 1002, and the blue laser light source 1003 are collimated into parallel lights by the collimator lenses 1004 and exit through the collimator lenses 1004, respectively. In the example illustrated in FIG. 32, a light source for light at a wavelength of 642 nm is used as the red laser light source 1001, a light source for light at a wavelength of 520 nm is used as the green laser light source 1002, and a light source for light at a wavelength of 450 nm is used as the blue laser light source 1003.

The laser lights collimated by the collimator lenses 1004 enter the optical-paths synthesizing unit 1005. The optical-paths synthesizing unit 1005 synthesizes three optical paths into one optical path, and is composed of an optical-paths synthesizing prism such as a dichroic mirror. This optical-paths synthesizing unit 1005 can have as many reflecting surfaces as the number of light sources. Therefore, in the example illustrated in FIG. 32, the optical-paths synthesizing unit 1005 has three reflecting surfaces 1006, 1007, and 1008.

A dichroic film that reflects a laser light of red wavelength and lets laser lights of green and blue wavelengths therethrough is formed on the reflecting surface 1006. A dichroic film that reflects a laser light of green wavelength and lets a laser light of blue wavelength therethrough is formed on the reflecting surface 1007. The reflecting surface 1008 reflects a laser light of blue wavelength. With these reflecting surfaces 1006 to 1008, the optical-paths synthesizing unit 1005 synthesizes three optical paths into one optical path.

The synthesized laser light is deflected by the two-dimensional light deflector 1009 so as to two-dimensionally scan a screen 1010. The formation of an image on the screen 1010 is made through the two-dimensional light scanning of laser light by the two-dimensional light deflector 1009 and the intensity modulation of the laser light sources 1001 to 1003. At this time, intensity modulation signals of the laser light sources 1001 to 1003 are sent from the LD drive unit 1011. An actuating signal to the two-dimensional light deflector 1009 is sent from the light-deflector drive unit 1012. The control of the LD drive unit 1011 and the two-dimensional light deflector 1009 to form an image is performed by the control unit 1013. The storage unit 1014 stores therein initial data for driving the two-dimensional light deflector 1009.

Figure 33:
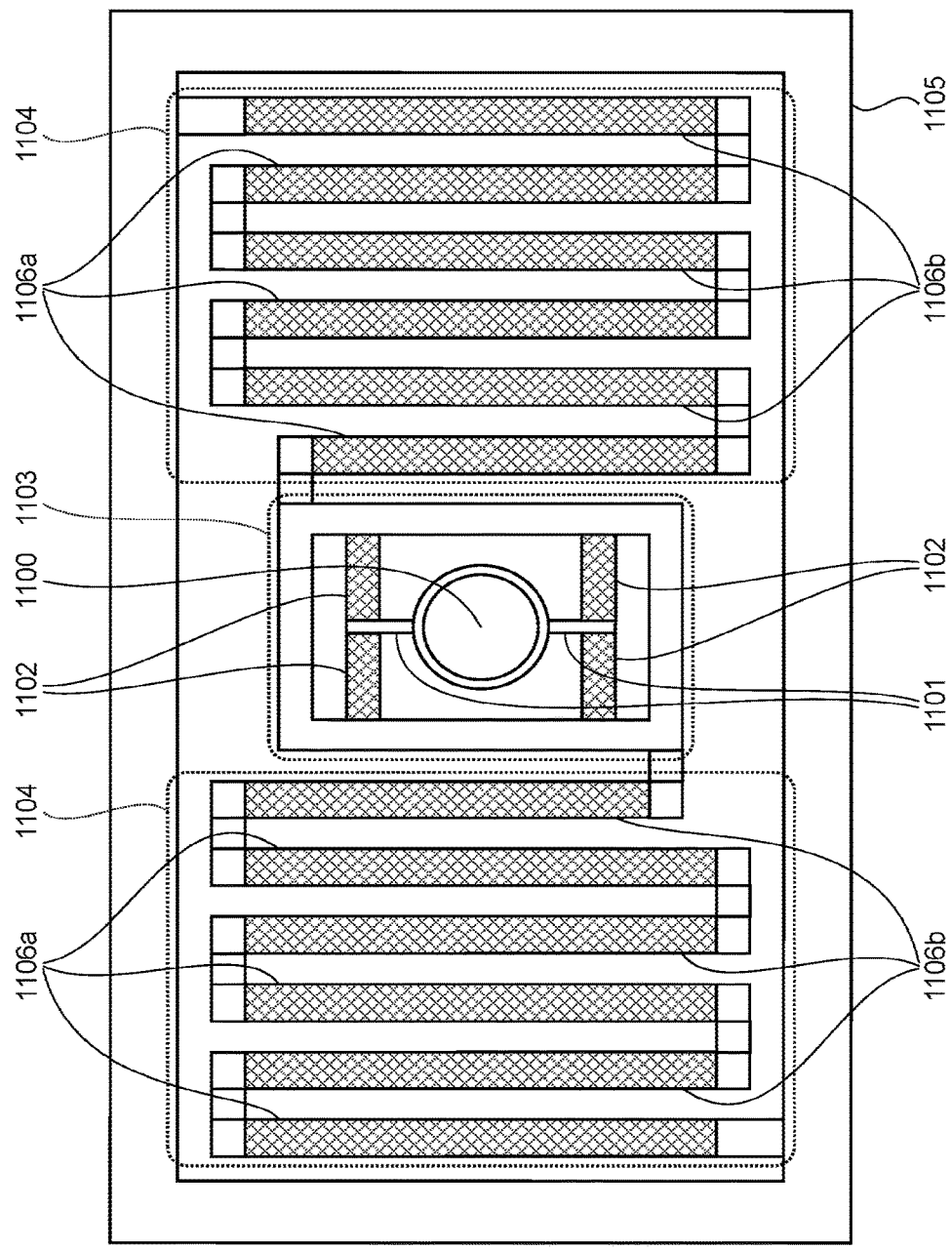
FIG. 33 is a schematic diagram illustrating a schematic configuration example of a two-dimensional light deflector according to the seventh embodiment.

Subsequently, an example of the more specific configuration of the two-dimensional light deflector 1009 in the seventh embodiment is explained in detail below with accompanying drawings. FIG. 33 is a schematic diagram illustrating a schematic configuration example of the two-dimensional light deflector according to the seventh embodiment.

As illustrated in FIG. 33, the two-dimensional light deflector 1009 includes the reflection mirror 1100 on the center thereof; the reflection mirror 1100 reflects a laser light. The reflection mirror 1100 is supported by a pair of torsion bars 1101. The end of each torsion bar 1101 is supported by one end of a corresponding piezoelectric cantilever 1102. The other ends of the piezoelectric cantilevers 1102 are supported by a movable frame 1103. The movable frame 1103 is supported by a pair of beam parts (meander beam portions) 1104 that has a plurality of turn parts and is formed by arranging the turn parts in a meandering fashion. The meander beam parts 1104 are supported by an elements frame member 1105. Each of the meander beam portions is provided with independent piezoelectric elements 1106a and 1106b.

In the configuration illustrated in FIG. 33, by driving the piezoelectric cantilevers 1102, the torsion bars 1101 supporting the reflection mirror 1100 are twisted, thereby the reflection mirror 1100 rotates and vibrates around the Y-axis. Here, the piezoelectric cantilevers 1102 are driven by sine waves, and mechanical resonance is used in the rotation of the reflection mirror 1100.

Figure 34:
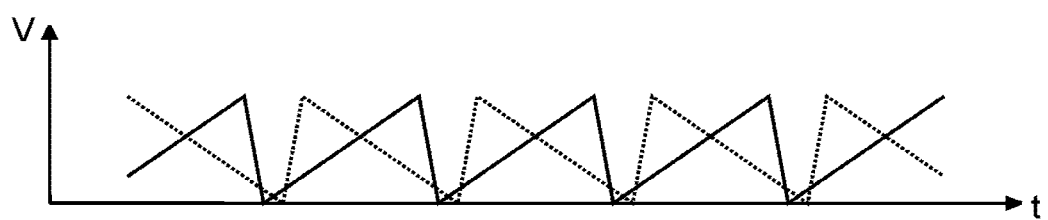
FIG. 34 is a waveform diagram illustrating an example of a voltage application pattern according to the seventh embodiment.

On the other hand, by driving the meander beam parts 1104, the movable frame 1103 rotates around the X-axis, and, in accordance with the rotation of the movable frame 1103, the reflection mirror 1100 also rotates around the X-axis. Specifically, voltage of saw-tooth waves is applied to every other piezoelectric element 1106a or 1106b independently installed on each of the meander beam portions of the meander beam parts 1104. Here, the piezoelectric elements 1106a all have a voltage application pattern of the same waveform, and the piezoelectric elements 1106b all have a voltage application pattern of the same waveform. An example of the voltage application pattern is illustrated in FIG. 34. In FIG. 34, the vertical axis indicates voltage value, and the horizontal axis indicates time. For example, a solid line shows the voltage application pattern of the piezoelectric elements 1106a (or 1106b), and a dashed line shows the voltage application pattern of the piezoelectric elements 1106b (or 1106a). According to the voltage application patterns illustrated in FIG. 34, the phase of saw-tooth waves is adjusted every other meander beam part 1104, thereby the meander beam parts 1104 are driven to rotate. By such driving, the light scanning with high uniformity can be achieved.

In FIG. 32, a projector device is illustrated as an example of the image projection device 1000; however, the image projection device 1000 is not limited to this example, and can be applied to a head-mounted display to be worn on the head, a head-up display that forms a virtual image using a diffuser or a microlens array as a screen and a translucent plate such as a windscreen, etc. FIG. 35 illustrates a schematic configuration example of a head-up display. As illustrated in FIG. 35, a head-up display 1200 has the same configuration as image projection device 1000 illustrated in FIG. 32, and has a configuration in which a microlens array 1215 including a plurality of microlenses and a translucent plate 1216 (for example, a combiner or a windscreen) are placed on an optical path above the two-dimensional light deflector 1009. In the configuration illustrated in FIG. 35, in accordance with deflection of a laser light around the first axis and the second axis, an image is formed on the microlens array 1215. Then, a virtual image 1217 that the image has been enlarged through the translucent plate 1216 can be recognized visually by the observer's eye 1218. In this case, as the laser light is diffused by the microlens array 1215, it becomes the virtual image 1217 with speckle noise reduced. As the translucent plate 1216, a vehicle window glass, etc. can be used.

The head-up display 1200 having such a configuration can be incorporated in a movable body, such as a vehicle, an aircraft, an ocean vessel, or a robot. Therefore, it is possible to provide the head-up display 1200 and a movable device including a movable body equipped with the head-up display 1200.

Next, an eighth embodiment is explained. In the eighth embodiment, an example of the drive control method implemented by the drive system according to any of the above-described embodiments is explained in detail with accompanying drawings. Herein, the drive system 100 according to the first embodiment (see FIG. 15) is cited as an example; however, the eighth embodiment can also be applied to any drive systems according to the other embodiments (for example, the drive system 500 illustrated in FIG. 30) in a similar fashion.

FIG. 36 is a flowchart illustrating an example of the drive control method according to the eighth embodiment. As illustrated in FIG. 36, first, the waveform generating unit 110 reads a device-specific sensitivity value (a parameter for individual difference correction represented by a coefficient or offset) from a memory (not illustrated) (Step S101).

Then, the waveform generating unit 110 generates a main-scanning drive waveform M by using the sensitivity value read at Step S101, and outputs the main-scanning drive waveform M to the main-scanning driving amplifier 121 (Step S102). The output main-scanning drive waveform M is amplified by the main-scanning driving amplifier 121 (Step S103), and then is output as an output M-AMP based on the main-scanning drive waveform M from the main-scanning driving amplifier 121 to the actuator 130 (Step S104).

Furthermore, the waveform generating unit 110 generates a main-scanning bias drive waveform M-BIAS by using the sensitivity value read at Step S101, and outputs the main-scanning bias drive waveform M-BIAS to the main-scanning bias amplifier 122 (Step S105). The output main-scanning bias drive waveform M-BIAS is amplified by the main-scanning bias amplifier 122 (Step S106), and then is output as an output M-COM based on the main-scanning bias drive waveform M-BIAS from the main-scanning bias amplifier 122 to the actuator 130 (Step S107).

Moreover, the waveform generating unit 110 generates a sub-scanning drive waveform S by using the sensitivity value read at Step S101, and outputs the sub-scanning drive waveform S to the sub-scanning driving amplifier 123 (Step S108). The output sub-scanning drive waveform S is amplified by the sub-scanning driving amplifier 123 (Step S109), and then is output as an output S-AMP based on the sub-scanning drive waveform S from the sub-scanning driving amplifier 123 to the actuator 130 (Step S110).

Furthermore, the waveform generating unit 110 generates a sub-scanning bias drive waveform S-BIAS by using the sensitivity value read at Step S101, and outputs the sub-scanning bias drive waveform S-BIAS to the sub-scanning bias amplifier 124 (Step S111). The output sub-scanning bias drive waveform S-BIAS is amplified by the sub-scanning bias amplifier 124 (Step S112), and then is output as an output S-COM based on the sub-scanning bias drive waveform S-BIAS from the sub-scanning bias amplifier 124 to the actuator 130 (Step S113).

As described above, the output M-AMP based on the main-scanning drive waveform M, the output M-COM based on the main-scanning bias drive waveform M-BIAS, the output S-AMP based on the sub-scanning drive waveform S, and the output S-COM based on the sub-scanning bias drive waveform S-BIAS are input to the actuator 130, thereby the actuator 130 is driven (Step S114). After that, once the driving of the actuator 130 has completed, the operation ends.

By operating as above, as described in the above embodiments, a relatively negative voltage can be applied to the common electrode part without using a negative supply. Consequently, the driving by a single supply can be achieved without a substantial increase in cost. The other configurations and the operation and effects are the same as the above-described embodiments, so detailed description of these is omitted.

The drive systems according to the above-described embodiments can be applied to any device as long as the device is operated by driving an actuator, and can be applied to, for example, an object recognition device that optically scans a laser light emitted from a laser light source in a target direction by driving an actuator having a reflecting surface and recognizes an object existing in the target direction by a reflected light from the target direction. The object recognition device is, for example, a laser radar, a laser three-dimensional measuring device, a biometric authentication device, etc.

According to the present invention, it is possible to achieve a drive system, video device, image projection device, and drive control method enabling the driving by a single supply without increasing cost substantially.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A drive system comprising:
an actuator including a drive unit;
a waveform generating unit configured to generate a voltage waveform for driving the drive unit;
a driving amplifier configured to amplify the voltage waveform so as to apply a voltage to the drive unit; and
a bias amplifier configured to apply a bias voltage to the drive unit, wherein
the driving amplifier and the bias amplifier are coupled to a shared power supply and the ground, and
the output voltage of the bias amplifier is higher than the minimum output voltage of the driving amplifier.

2. The drive system according to claim 1, wherein
the actuator includes:
a movable part;
a first drive unit configured to drive the movable part in a first direction; and
a second drive unit configured to drive the movable part in a second direction,
the driving amplifier includes:
a first driving amplifier configured to apply a voltage to the first drive unit; and
a second driving amplifier configured to apply a voltage to the second drive unit,
the bias amplifier includes:
a first bias amplifier configured to apply a voltage to the first drive unit; and
a second bias amplifier configured to apply a voltage to the second drive unit,
the first driving amplifier and the second driving amplifier are coupled to a shared power supply, and
the first bias amplifier and the second bias amplifier are coupled to the shared ground.

3. The drive system according to claim 2, wherein
the output voltage of the bias amplifier includes a first output voltage of the first bias amplifier and a second output voltage of the second bias amplifier,
the minimum output voltage of the driving amplifier includes a first minimum output voltage of the first driving amplifier and a second minimum output voltage of the second driving amplifier,
the second output voltage is higher than the second minimum output voltage, and
the first output voltage approximately coincides with the first minimum output voltage.

4. The drive system according to claim 2, wherein the output of the first bias amplifier is variable.

5. The drive system according to claim 2, wherein the output of the second bias amplifier is variable.

6. The drive system according to claim 2, wherein the outputs of the first and second bias amplifiers are variable.

7. The drive system according to claim 2, further comprising a regulator configured to, based on first power-supply voltage supplied from the power supply, generate a second power-supply voltage having a different voltage value from a voltage value of the first power-supply voltage, wherein
the first driving amplifier and the first bias amplifier are coupled to between the regulator and the ground.

8. A video device comprising the drive system according to claim 1.

9. An image projection device comprising:
the drive system according to claim 1;
a mirror that is attached to the drive unit of the actuator and is rotatable in two axial directions;
a light source configured to output a laser light;
an optical system configured to make the laser light enter the mirror; and
a control unit configured to control the drive system and drive the mirror.

10. The image projection device according to claim 9, wherein
the actuator includes a support unit configured to support the mirror,
the support unit includes a plurality of beams continuing in a meandering fashion and a plurality of piezoelectric elements respectively disposed on the beams, and
the drive system applies two voltages having non-similar waveforms individually to two piezoelectric elements respectively disposed on two adjacent beams in parallel.

11. A drive control method performed in a drive system, the drive system including an actuator including a drive unit; a waveform generating unit configured to generate a voltage waveform for driving the drive unit; a driving amplifier configured to amplify the voltage waveform and apply a voltage to the drive unit; and a bias amplifier configured to apply a bias voltage to the drive unit, and the driving amplifier and the bias amplifier being coupled to a shared power supply and the ground, the drive control method comprising:
outputting, by the bias amplifier, an output voltage higher than the minimum output voltage of the driving amplifier.

12. A drive control method performed in a drive system, the drive system including an actuator including a drive unit; a waveform generating unit configured to generate a voltage waveform for driving the drive unit; a driving amplifier configured to amplify the voltage waveform and apply a voltage to the drive unit; and a bias amplifier configured to apply a bias voltage to the drive unit, and the driving amplifier and the bias amplifier being coupled to a shared power supply and the ground, the drive control method comprising:
generating, by the waveform generating unit, a first voltage waveform and a second voltage waveform;
amplifying, by the driving amplifier, the first voltage waveform;
amplifying, by the bias amplifier, the second voltage waveform, the amplifying by the bias amplifier includes outputting the second voltage waveform to be higher than a minimum output voltage of the driving amplifier; and
driving the actuator based on the amplified first and second voltage waveforms.

* * * * *